US010750205B2

(12) United States Patent
Reddy et al.

(10) Patent No.: US 10,750,205 B2
(45) Date of Patent: *Aug. 18, 2020

(54) SELECTIVE USE OF START CODE EMULATION PREVENTION

(71) Applicant: Microsoft Technology Licensing, LLC, Redmond, WA (US)

(72) Inventors: Bakkama Srinath Reddy, Redmond, WA (US); Shyam Sadhwani, Bellevue, WA (US); Victor Cherepanov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,680

(22) Filed: Mar. 6, 2019

(65) Prior Publication Data

US 2019/0208226 A1 Jul. 4, 2019

Related U.S. Application Data

(63) Continuation of application No. 15/253,526, filed on Aug. 31, 2016, now Pat. No. 10,271,069.

(51) Int. Cl.
*H04N 19/70* (2014.01)
*H04N 21/44* (2011.01)

(52) U.S. Cl.
CPC ....... *H04N 19/70* (2014.11); *H04N 21/44008* (2013.01)

(58) Field of Classification Search
CPC .......................... H04N 19/70; H04N 21/44008

USPC .................................................... 375/240.28
See application file for complete search history.

(56) References Cited

U.S. PATENT DOCUMENTS

| 6,956,600 | B1* | 10/2005 | Gaylord | H04N 7/15 348/14.08 |
| 9,892,188 | B2* | 2/2018 | Sullivan | G06F 16/285 |
| 2005/0123055 | A1* | 6/2005 | Winger | H04N 21/235 375/240.25 |
| 2008/0304757 | A1* | 12/2008 | Chen | H04N 21/4147 382/232 |
| 2011/0280314 | A1* | 11/2011 | Sankaran | G06F 9/3877 375/240.25 |
| 2013/0117270 | A1* | 5/2013 | Sullivan | G06F 16/285 707/740 |

(Continued)

*Primary Examiner* — Zaihan Jiang
(74) *Attorney, Agent, or Firm* — Klarquist Sparkman, LLP

(57) ABSTRACT

Approaches to selectively using start code emulation prevention ("SCEP") on encoded data for media content are described herein. For example, a media encoder selectively performs SCEP processing on encoded data for media content, and sets a value of a syntax element that indicates whether or not to perform SCEP processing on the encoded data. The encoder stores the encoded data for output as part of a bitstream, where the syntax element is signaled in association with the bitstream. A media decoder receives the encoded data, determines, from the value of the syntax element, whether or not to perform SCEP processing on the encoded data, and selectively performs SCEP processing on the encoded data. In this way, the computational cost of scanning operations for SCEP processing can be avoided in many scenarios, and bit rate increases due to insertion of SCEP bytes can be limited.

20 Claims, 14 Drawing Sheets

(56) References Cited

U.S. PATENT DOCUMENTS

| | | | |
|---|---|---|---|
| 2014/0003489 A1* | 1/2014 | Hannuksela | H04N 19/70 375/240.02 |
| 2014/0092987 A1* | 4/2014 | Singer | H04N 19/70 375/240.25 |
| 2014/0314148 A1* | 10/2014 | Lainema | H04N 19/31 375/240.12 |
| 2016/0198171 A1* | 7/2016 | Wu | H04N 19/436 375/240.16 |
| 2017/0064321 A1* | 3/2017 | Kashyap | H04N 19/436 |
| 2018/0139469 A1* | 5/2018 | Lainema | H04N 19/109 |

* cited by examiner software 180 implementing one or more innovations for selective use of start code emulation prevention (SCEP)

FIG. 3a 300 start code (310)
0000000000000000000000000010000001010010101110001001111100010100
encoded data (320) for unit n ...11010000000000000000000010000111010001110101000000001000001
encoded data (320) for unit n
emulated start code (330)

...1110010101000000000000000000000000010000011011100010110110111100
start code (312)
encoded data (320) for unit n
encoded data (322) for unit n + 1

FIG. 3b  301 start code (310)
0000000000000000000000000001000000010100101011110001001111100010100 ...

encoded data (320) for unit $n$

... 1 1 0 1 0 0 0 0 0 0 0 0 0 0 0 0 0 0 0 0 0 0 0 0 0 0 1 1 0 0 0 0 0 0 0 1 0 0 0 0 1 1 1 0 1 0 0 0 1 1 1 0 1 0 1 0 0 0 0 0 0 0 ...

encoded data (320) for unit $n$

SCEP byte (340), which disrupts emulated start code

... 1 1 1 0 0 0 0 1 1 1 1 0 0 1 0 1 0 1 0 0 0 0 0 0 0 0 0 0 0 0 0 0 0 0 0 0 0 1 0 0 0 0 0 1 1 0 1 1 1 0 0 0 1 0 1 1 0 1 ...

encoded data (320) for unit $n$ start code (312)

encoded data (322) for unit $n + 1$

600

800

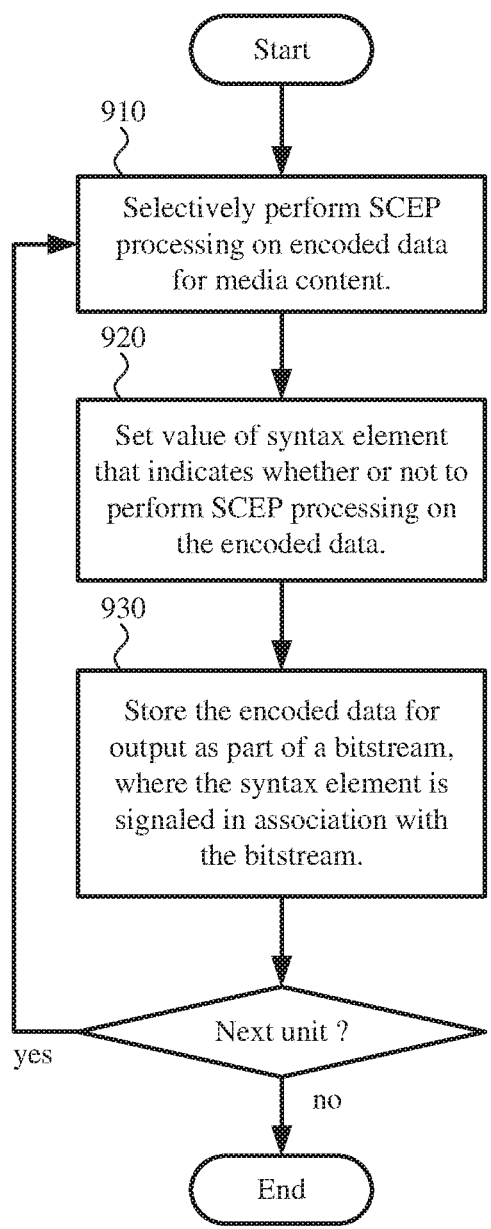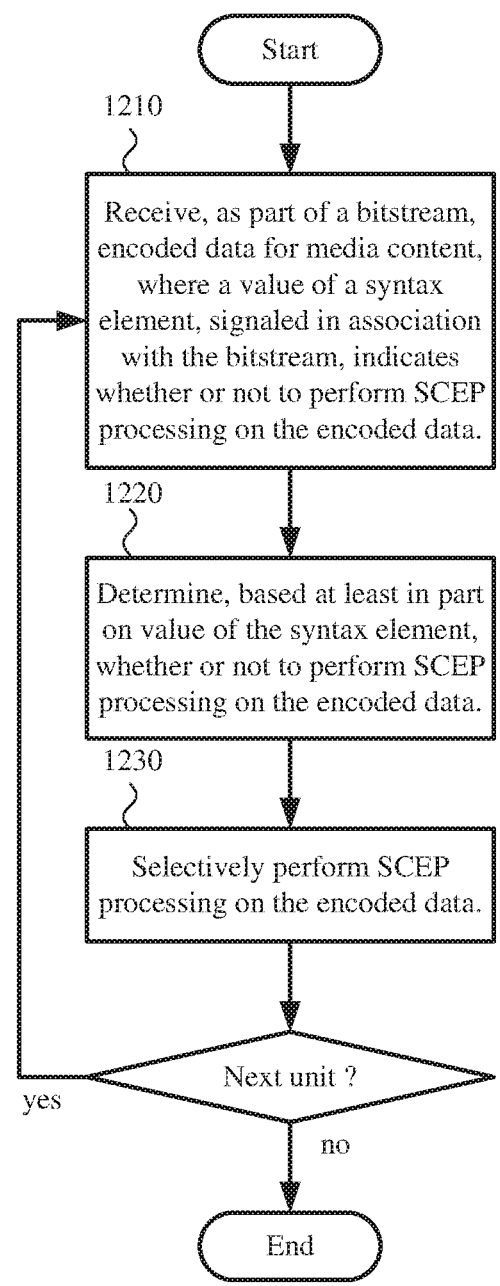

FIG. 10    1000    proactive SCEP processing, depending on start code usage
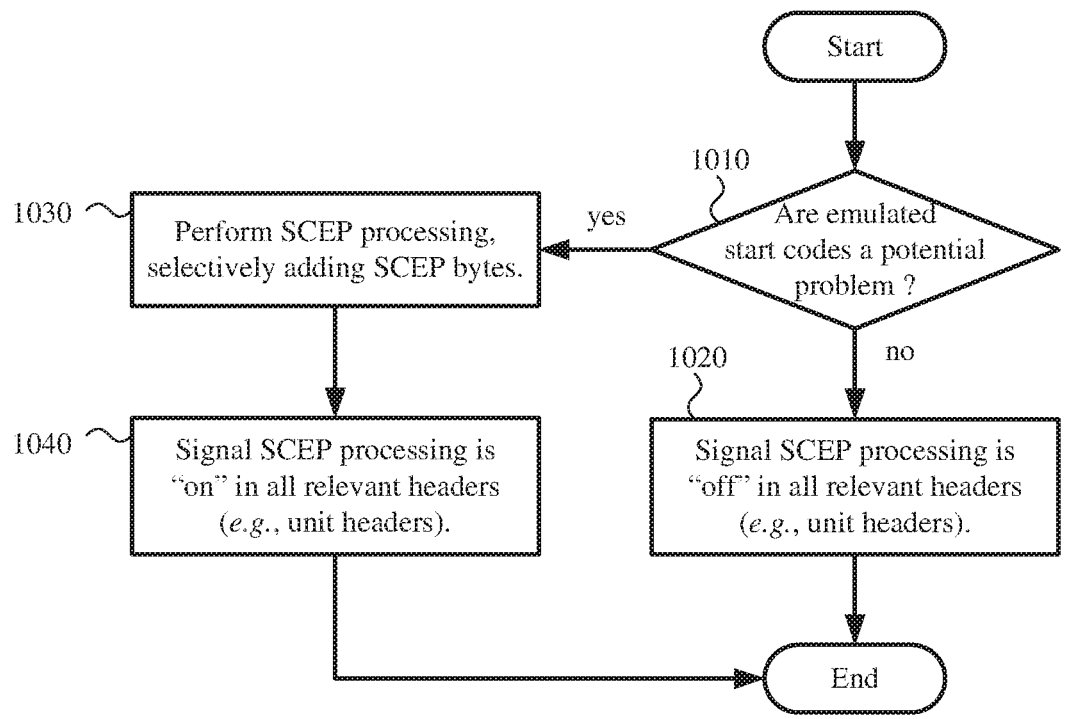

FIG. 11  1100  reactive SCEP processing, depending on presence of emulated start codes
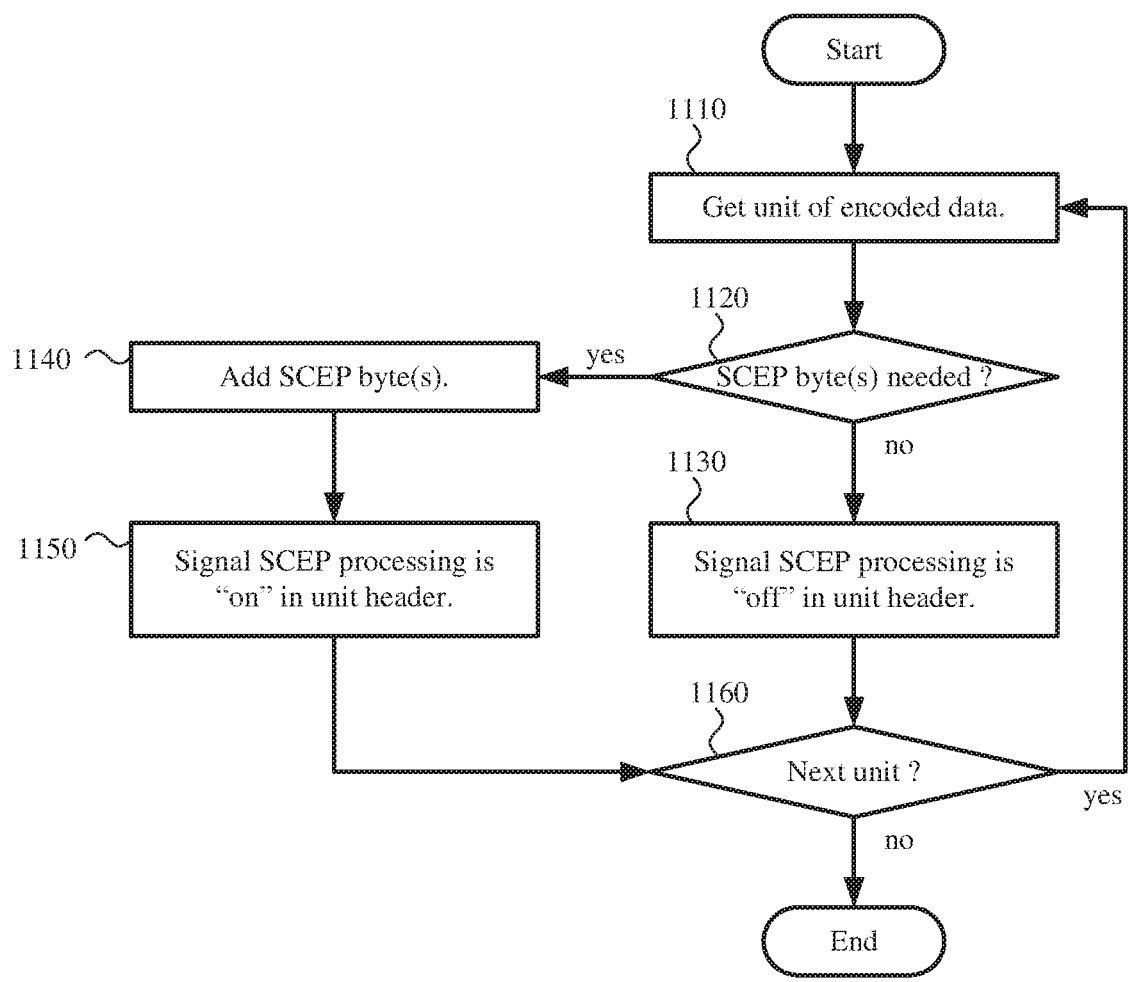

FIG. 13   1300

| nal_unit( NumBytesInNALunit ) { | Descriptor |
|---|---|
| ... | |
| nal_unit_type | u(5) |
| emulation_prevention_in_use | f(1) |
| NumBytesInRBSP = 0 | |
| nalUnitHeaderBytes = 2 | |
| ... | |
| if (emulation_prevention_in_use == 1 ) { /* emulation prevention in use */ | |
| for( i = nalUnitHeaderBytes; i < NumBytesInNALunit; i++ ) { | |
| if( i + 2 < NumBytesInNALunit && next_bits( 24 ) == 0x000003 ) { | |
| rbsp_byte[ NumBytesInRBSP++ ] | b(8) |
| rbsp_byte[ NumBytesInRBSP++ ] | b(8) |
| i += 2 | |
| emulation_prevention_three_byte /* equal to 0x03 */ | f(8) |
| } else | |
| rbsp_byte[ NumBytesInRBSP++ ] | b(8) |
| } | |
| } | |
| else { /* emulation prevention not in use */ | |
| for( i = nalUnitHeaderBytes; i < NumBytesInNALunit; i++ ) | |
| rbsp_byte[ NumBytesInRBSP++ ] | |
| } | |
| } | |

FIG. 14a    1400

| nal_unit( NumBytesInNALunit ) { | Descriptor |
|---|---|
|   nal_unit_header() | |
|   NumBytesInRBSP = 0 | |
|   nalUnitHeaderBytes = 3 | |
|   if (emulation_prevention_in_use == 1 ) { /* emulation prevention in use */ | |
|     for( i = nalUnitHeaderBytes; i < NumBytesInNALunit; i++ ) { | |
|       if( i + 2 < NumBytesInNALunit && next_bits( 24 ) == 0x000003 ) { | |
|         rbsp_byte[ NumBytesInRBSP++ ] | b(8) |
|         rbsp_byte[ NumBytesInRBSP++ ] | b(8) |
|         i += 2 | |
|         emulation_prevention_three_byte /* equal to 0x03 */ | f(8) |
|       } else | |
|         rbsp_byte[ NumBytesInRBSP++ ] | b(8) |
|       } | |
|     } | |
|   else { /* emulation prevention not in use */ | |
|     for( i = nalUnitHeaderBytes; i < NumBytesInNALunit; i++ ) | |
|       rbsp_byte[ NumBytesInRBSP++ ] | |
|     } | |
| } | |

FIG. 14b    1410

| nal_unit_header() { | Descriptor |
|---|---|
| | |
|   nal_unit_type | u(6) |
|   emulation_prevention_in_use | f(1) |
| | |
| } | |

FIG. 15a 1501

| nal_unit_with_SCEP( NumBytesInNALunit ) { | Descriptor |
|---|---|
|   nal_unit_header() | |
|   NumBytesInRBSP = 0 | |
|   nalUnitHeaderBytes = 3 | |
|   for( i = nalUnitHeaderBytes; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

FIG. 15b 1502

| nal_unit_without_SCEP( NumBytesInNALunit ) { | Descriptor |
|---|---|
|   nal_unit_header() | |
|   NumBytesInRBSP = 0 | |
|   nalUnitHeaderBytes = 3 | |
|   for( i = nalUnitHeaderBytes; i < NumBytesInNALunit; i++ ) | |
|     rbsp_byte[ NumBytesInRBSP++ ] | |
| } | |

SELECTIVE USE OF START CODE EMULATION PREVENTION

CROSS REFERENCE TO RELATED APPLICATIONS

This application is a continuation of U.S. patent application Ser. No. 15/253,526, filed Aug. 31, 2016, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define options for the syntax of an encoded video bitstream and corresponding decoding operations.

At a low level, a bitstream of encoded video is a series of bits (zeros and ones) that form the coded representation of the video. A bitstream is organized according to rules defined in a video codec standard or format. When parsing a bitstream, a decoder reads one or more bits at a current position in the bitstream and interprets the bit(s) according to the rules that apply at the current position in the bitstream. After updating the current position to shift out the bits that have been read and interpreted, the decoder can continue by reading and interpreting one or more bits at the current (updated) position in the bitstream. To parse a bitstream correctly, a decoder tracks the current position in the bitstream and applies the appropriate rules for bit(s) read at the current position. If encoded data in the bitstream is lost or corrupted (e.g., due to network congestion or noise), the decoder may lose synchronization between the current position in the bitstream and correct rules to apply. In this case, the decoder may incorrectly interpret bits read from the bitstream, causing decoding to fail.

Some codec standards and formats use start codes to designate the boundaries of separate units of encoded data in a bitstream. In general, a start code is a sequence of bits that only appears in the encoded data when marking the start of a unit of encoded data. If a decoder starts decoding in the middle of a bitstream, or if a decoder loses synchronization when parsing a bitstream (e.g., because of loss or corruption of encoded data), the decoder can locate the next start code in the bitstream and begin parsing encoded data from that position, which is the start of some type of unit according to the codec standard or format. In the SMPTE 421M standard, for example, a start code is a four-byte value, which includes the three-byte prefix 0x000001 (in binary, 23 zeros followed by a 1) and a one-byte suffix that identifies the type of bitstream data unit at the start code. As another example, in the H.264 standard and H.265 standard, a start code begins with a three-byte prefix 0x000001. In the H.264 standard, the start code prefix is followed by the first byte of a network abstraction layer ("NAL") unit, which includes an identifier of the type of the NAL unit. In the H.265 standard, the start code prefix is followed by a two-byte NAL unit header, which includes a type identifier for the NAL unit. During regular operation, a decoder typically scans encoded data in a bitstream to identify start codes and thereby determine lengths of units of encoded data. A decoder may also scan for the next start code if synchronization or byte alignment has been lost. (Encoded data can be scanned byte-after-byte, with start codes aligned with byte boundaries. If synchronization is lost, byte alignment may also be lost. In this case, a decoder may scan bit-after-bit for a pattern such as a zero-value byte followed by a start code, in order to recover byte alignment.)

In a bitstream, encoded data includes values for different parameters, one value after another. This can cause a problem if, inadvertently, some combination of values matches (emulates) a start code. Some codec standards and formats address this concern by defining values such that no valid combination can possibly emulate a start code. More recently, some codec standards use start code emulation prevention ("SCEP") processing to address this concern. For SCEP, an encoder can scan encoded data to identify any pattern of bits that inadvertently matches (emulates) a start code. The encoder then disrupts this pattern. For a bitstream defined according to the SMPTE 421M standard, H.264 standard, or H.265 standard, for example, an encoder can insert a SCEP byte of 0x03 (in binary, 00000011) whenever the encoder encounters the pattern 0x000000, 0x000001, 0x000002, or 0x000003 in encoded data, resulting in the pattern 0x00000300, 0x00000301, 0x00000302, or 0x00000303. (In each of these patterns, the third byte is the inserted SCEP byte 0x03.) In binary, whenever the encoder finds the bit pattern 00000000 00000000 000000xx (where xx represents any two-bit pattern), the encoder can replace that bit pattern with 00000000 00000000 00000011 000000xx, where 00000011 is the SCEP byte. In this way, emulation of the start code prefix, which is 23 zeros followed by a one, is disrupted, since the replacement pattern includes at most 22 zeros followed by a one. To undo SCEP, after locating start codes for the current unit (and perhaps the next unit), but before parsing encoded data for the current unit, a decoder can scan the encoded data of the current unit to find any occurrences of the bit pattern 00000000 00000000 00000011 000000xx. If such a pattern is encountered, the decoder can remove the SCEP byte, leaving 00000000 00000000 000000xx, which is the original bit pattern of encoded data.

While SCEP bytes provide an effective way to prevent emulation of start codes within encoded data, using SCEP bytes adds processing overhead. For example, during or after encoding, an encoder scans encoded data, or otherwise tracks encoded data for output, in order to identify any pattern that should be disrupted with a SCEP byte. Before decoding a given unit of encoded data, a decoder scans the encoded data to identify any pattern from which a SCEP byte should be removed. Although the operation of inserting or removing a SCEP byte is simple, scanning encoded data on a byte-by-byte basis for occurrences of relevant bit patterns can require significant resources. Also, SCEP bytes increase the amount of data in a bitstream. For some units (e.g., units with encoded data in which the pattern 0x000000 is common), the increase in bit rate due to SCEP bytes can be significant.

SUMMARY

In summary, the detailed description presents approaches to selectively using start code emulation prevention ("SCEP") on encoded data for media content. For example, an encoder selectively performs SCEP processing on encoded data in a bitstream. A value of a syntax element associated with the bitstream indicates, to a corresponding decoder, whether or not to perform SCEP processing. From the value of this syntax element, the corresponding decoder determines whether or not to perform SCEP processing on the encoded data, then selectively performs SCEP processing on the encoded data. In this way, the overhead of SCEP processing and SCEP bytes can be avoided in many scenarios.

According to one aspect of the innovations described herein, a media encoder, bitstream rewriter, or other media processing tool selectively performs SCEP processing on encoded data for media content. The media content can be video content, audio content, image content, or some other type of media content. Typically, the encoded data is in a media elementary stream format that permits SCEP (e.g., video elementary stream format, audio elementary stream format, etc.). The media processing tool sets a value of a syntax element (e.g., a one-bit flag) that indicates whether or not to perform SCEP processing on the encoded data. The encoded data is stored for output as part of a bitstream, and the syntax element is signaled in association with the bitstream. For example, the syntax element is signaled in a header of a network abstraction layer ("NAL") unit that includes at least part of the encoded data.

SCEP processing can be selectively performed in a way that depends proactively, regardless of presence or absence of emulated start codes in units of the encoded data, on start code usage for the encoded data. For example, the value of the syntax element that indicates whether or not to perform SCEP processing on the encoded data is set based on a setting that indicates whether start codes are used. In this case, SCEP processing is performed on the encoded data if start codes are used. Or, as another example, the value of the syntax element that indicates whether or not to perform SCEP processing on the encoded data is set based on the container format for the encoded data. In this case, SCEP processing is performed on the encoded data if the container format lacks, for the units of the encoded data, respectively, fields indicating lengths of the encoded data for the respective units. If SCEP processing is performed on the encoded data, the media processing tool scans the encoded data and, upon detection of a pattern that emulates a start code, inserts a SCEP byte to disrupt the pattern. Otherwise, the media processing tool skips the scanning and insertion operations.

Alternatively, SCEP processing can be selectively performed in a way that depends, reactively, on presence of emulated start codes in respective units of the encoded data. For example, the media processing tool checks, on a unit-by-unit basis for the respective units of the encoded data, whether a given unit includes any pattern that emulates a start code. The value of the syntax element, for a given one of the respective units of the encoded data, is set based on results of the checking for that unit of the encoded data. If SCEP processing is performed on the encoded data, the media processing tool scans the encoded data and, upon detection of a pattern that emulates a start code, inserts a SCEP byte to disrupt the pattern.

According to another aspect of the innovations described herein, a media decoder, bitstream rewriter, or other media processing tool receives, as part of a bitstream, encoded data for media content (e.g., video content, audio content, image content, or some other type of media content, in a media elementary stream format that permits SCEP). A value of a syntax element (e.g., a one-bit flag), which is signaled in association with the bitstream, indicates whether or not to perform SCEP processing on the encoded data. For example, the syntax element is signaled in a header of a NAL unit. The media processing tool determines, from the value of the syntax element, whether or not to perform SCEP processing on the encoded data. The media processing tool selectively performs SCEP processing on the encoded data. For example, if SCEP processing is to be performed on the encoded data, the media processing tool scans the encoded data and, upon detection of a pattern that includes a SCEP byte, removes the SCEP byte. Otherwise, if SCEP processing is not to be performed, the media processing tool skips the scanning and removal operations.

The innovations can be implemented as part of a method, as part of a computer system that includes one or more processing units configured to perform operations for the method, or as part of one or more computer-readable media storing computer-executable instructions for causing a computer system (or, more specifically, one or more processing units) to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIGS. 3a and 3b are diagrams illustrating an example of SCEP.

FIG. 9 is a flowchart illustrating a generalized technique for selectively performing SCEP processing on encoded data after encoding.

FIG. 10 is a flowchart illustrating an example technique for proactive SCEP processing of encoded data, depending on start code usage.

FIG. 11 is a flowchart illustrating an example technique for reactive SCEP processing of encoded data, depending on presence of emulated start codes.

FIG. 12 is a flowchart illustrating a generalized technique for selectively performing SCEP processing on encoded data before decoding.

FIGS. 13, 14*a*, 14*b*, 15*a*, and 15*b* are diagrams illustrating example approaches to signaling a syntax element that indicates whether or not to perform SCEP processing.

DETAILED DESCRIPTION

Figure 1:
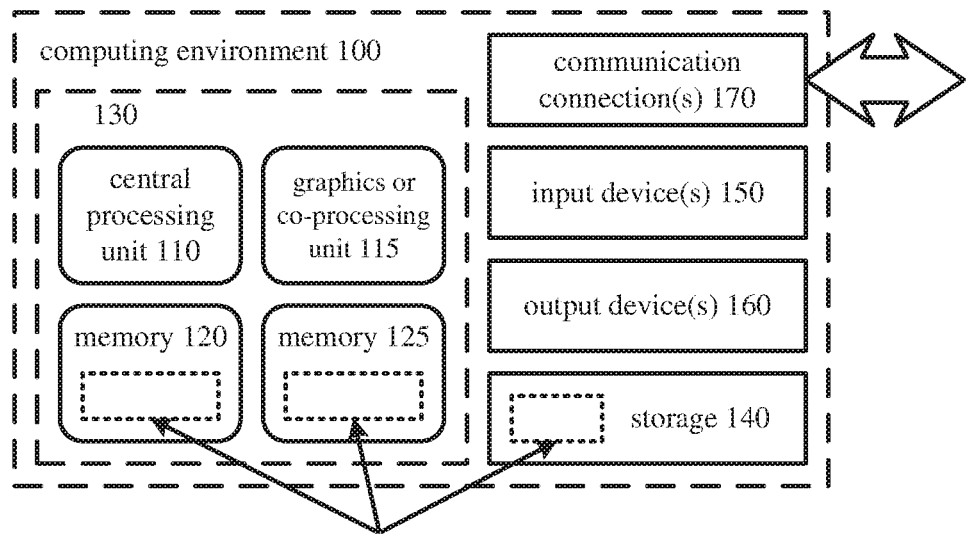
FIG. 1 is a diagram illustrating an example computer system in which some described embodiments can be implemented.

The detailed description presents approaches to selectively using start code emulation prevention ("SCEP") on encoded data for media content. For example, a media encoder, bitstream rewriter, or other media processing tool selectively performs SCEP processing on encoded data for media content, and sets a value of a syntax element that indicates whether or not to perform SCEP processing on the encoded data. The media processing tool stores the encoded data for output as part of a bitstream, where the syntax element is signaled in association with the bitstream. In this way, the computational cost of scanning operations for SCEP processing after encoding can be avoided in many scenarios, and bit rate increases due to insertion of SCEP bytes can be limited.

As another example, a media decoder, bitstream rewriter, or other media processing tool receives, as part of a bitstream, encoded data for media content. A value of a syntax element, signaled in association with the bitstream, indicates whether or not to perform SCEP processing on the encoded data. The media processing tool determines, from the value of the syntax element, whether or not to perform SCEP processing on the encoded data, then selectively performs SCEP processing on the encoded data. In this way, the computational cost of scanning operations for SCEP processing before decoding can be avoided in many scenarios.

Some of the innovations described herein are illustrated with reference to terms specific to the H.264 standard or H.265 standard. The innovations described herein can also be implemented for other video codec standards or formats, or extensions or variations thereof, including future video codec standards or formats that permit the use of start codes.

Some of the innovations described herein are illustrated with reference to video codec standards or formats, video encoders, and video decoders. Alternatively, the innovations can be implemented for codec standards or formats, encoders, and decoders for some other type of media content (e.g., audio, images, other audio/visual content, point clouds).

In the examples described herein, identical reference numbers in different figures indicate an identical component, module, or operation. Depending on context, a given component or module may accept a different type of information as input and/or produce a different type of information as output, or be processed in a different way.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for selective use of SCEP, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic media such as magnetic disks, magnetic tapes or cassettes, optical media such as CD-ROMs or DVDs, or any other medium which can be used to store information and which can be accessed within the computer system (100). The storage (140) stores instructions for the software (180) implementing one or more innovations for selective use of SCEP.

The input device(s) (150) may be a touch input device such as a keyboard, mouse, pen, or trackball, a voice input device, a scanning device, or another device that provides input to the computer system (100). For images or video, the input device(s) (150) may be a camera, video card, screen capture module, TV tuner card, or similar device that accepts image or video input in analog or digital form, or a CD-ROM or CD-RW that reads image or video input into the computer system (100). For point cloud data, the input device(s) may be a set of depth cameras and other cameras or similar devices that capture point cloud input. For audio, the input device(s) (150) may be a microphone or similar device that accepts audio input in analog or digital form, or a CD-ROM or CD-RW that reads audio input into the computer system (100). The output device(s) (160) may be a display, printer, speaker, CD-writer, or other device that provides output from the computer system (100).

The communication connection(s) (170) enable communication over a communication medium to another computing entity. The communication medium conveys information such as computer-executable instructions, media input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. Thus, the computer-readable media can be, for example, volatile memory, non-volatile memory, optical media, or magnetic media. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The disclosed methods can also be implemented using specialized computing hardware configured to perform any of the disclosed methods. For example, the disclosed methods can be implemented by an integrated circuit (e.g., an AMC such as an ASIC digital signal processor ("DSP"), a graphics processing unit ("GPU"), or a programmable logic device ("PLD") such as a field programmable gate array ("FPGA")) specially designed or configured to implement any of the disclosed methods.

The terms "system" and "device" are used interchangeably herein. Unless the context clearly indicates otherwise, neither term implies any limitation on a type of computer system or computing device. In general, a computer system or computing device can be local or distributed, and can include any combination of special-purpose hardware and/or general-purpose hardware with software implementing the functionality described herein.

For the sake of presentation, the detailed description uses terms like "set" and "determine" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
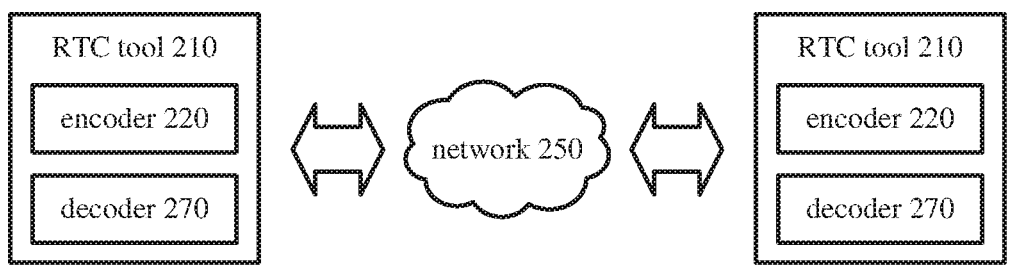
FIGS. 2a and 2b are diagrams illustrating example network environments in which some described embodiments can be implemented.
Figure 2B:

FIGS. 2a and 2b show example network environments (201, 202) that include media encoders (220) and media decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. For video, a given encoder (220) can produce output compliant with the H.265 standard, SMPTE 421M standard, ISO/IEC 14496-10 standard (also known as H.264), another standard, or a proprietary format such as VP8 or VP9, or an extension or variation thereof, with a corresponding decoder (270) accepting encoded data from the encoder (220). For audio, a given encoder (220) can produce output compliant with an audio codec standard or format, or an extension or variation thereof, with a corresponding decoder (270) accepting encoded data from the encoder (220). Similarly, for image content, point cloud content, or other media content, a given encoder (220) can produce output compliant with an media codec standard or format, or an extension or variation thereof, with a corresponding decoder (270) accepting encoded data from the encoder (220). The bidirectional communication can be part of a conference call, telephone call, or other two-party or multi-party communication scenario. An RTC tool (210) can include multiple encoders for different media types and multiple decoders for different media types. Although the network environment (201) in FIG. 2a includes two RTC tools (210), the network environment (201) can instead include three or more RTC tools (210) that participate in multi-party communication.

Figure 4:
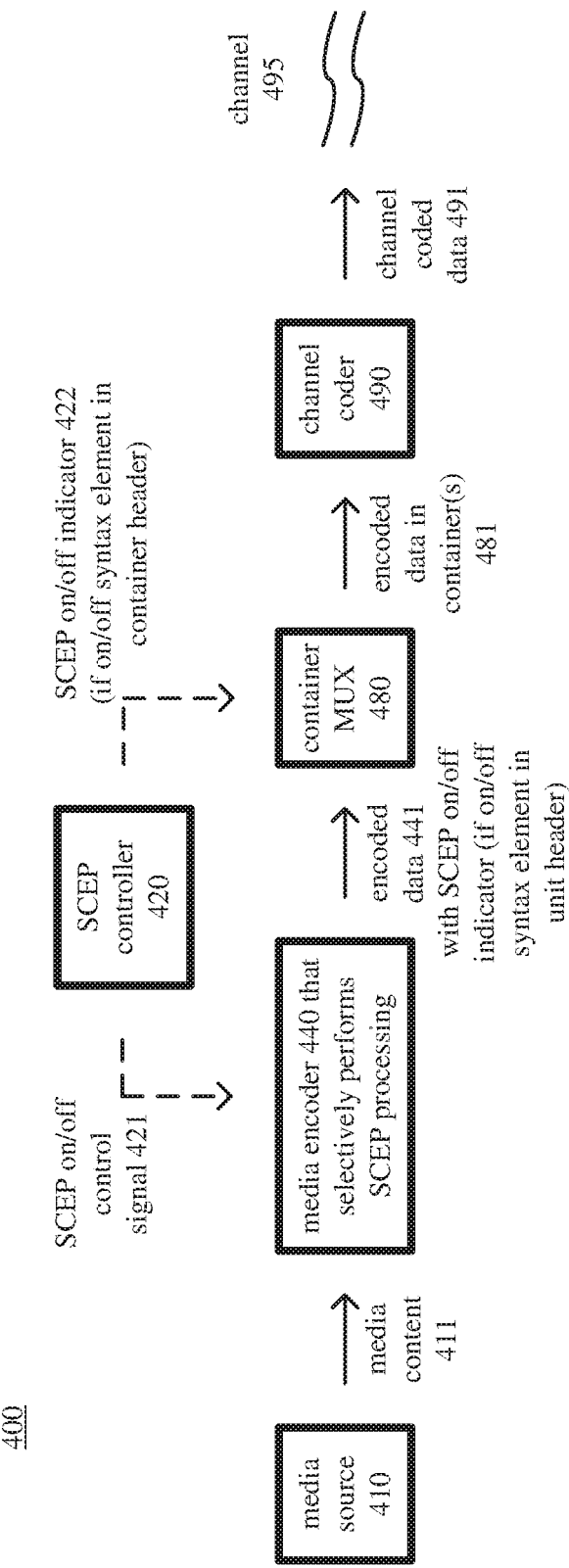
FIGS. 4 and 5 are diagrams illustrating an example media encoder system and example video encoder system, respectively, in conjunction with which some described embodiments can be implemented.
Figure 5:
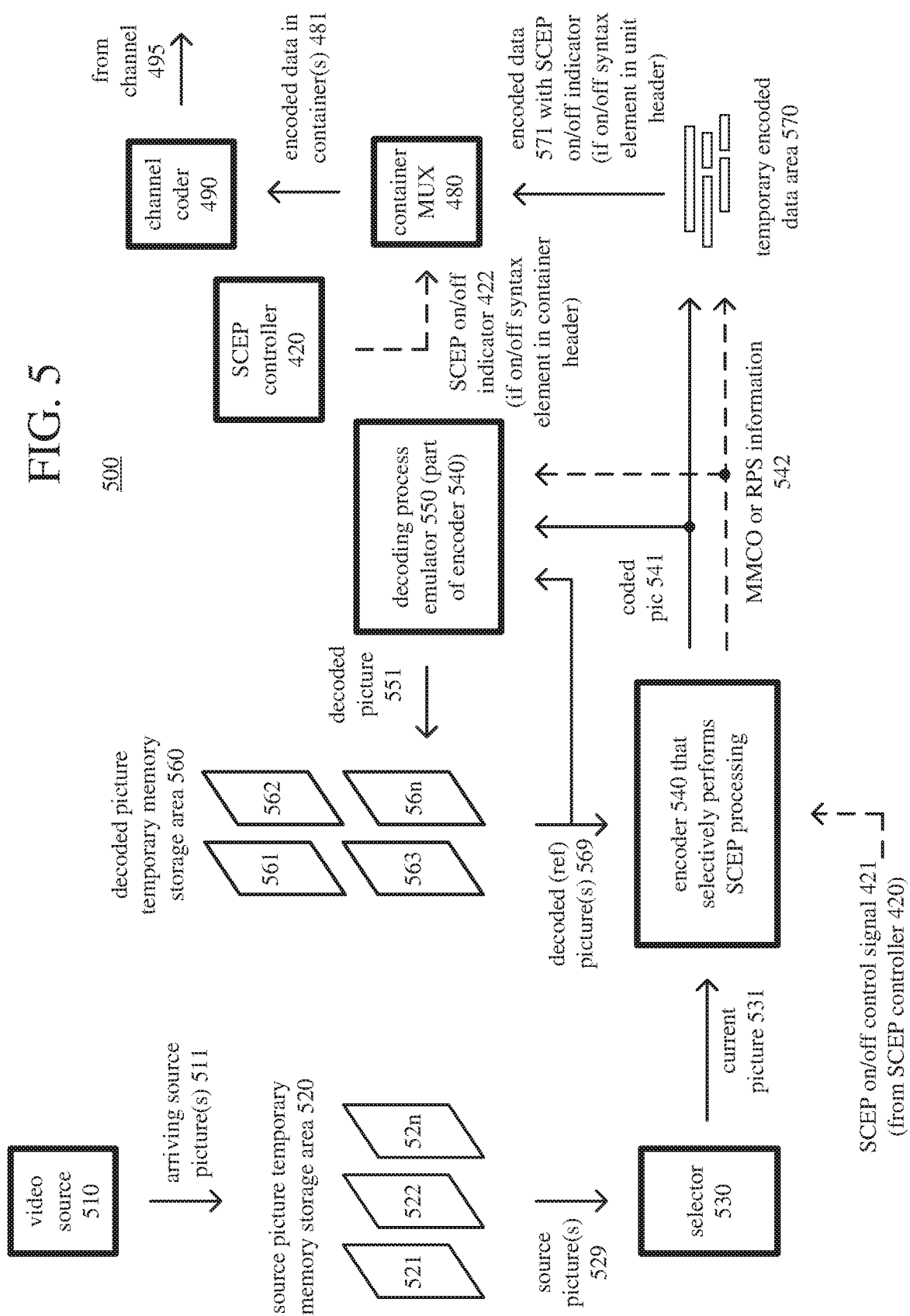
Figure 6:
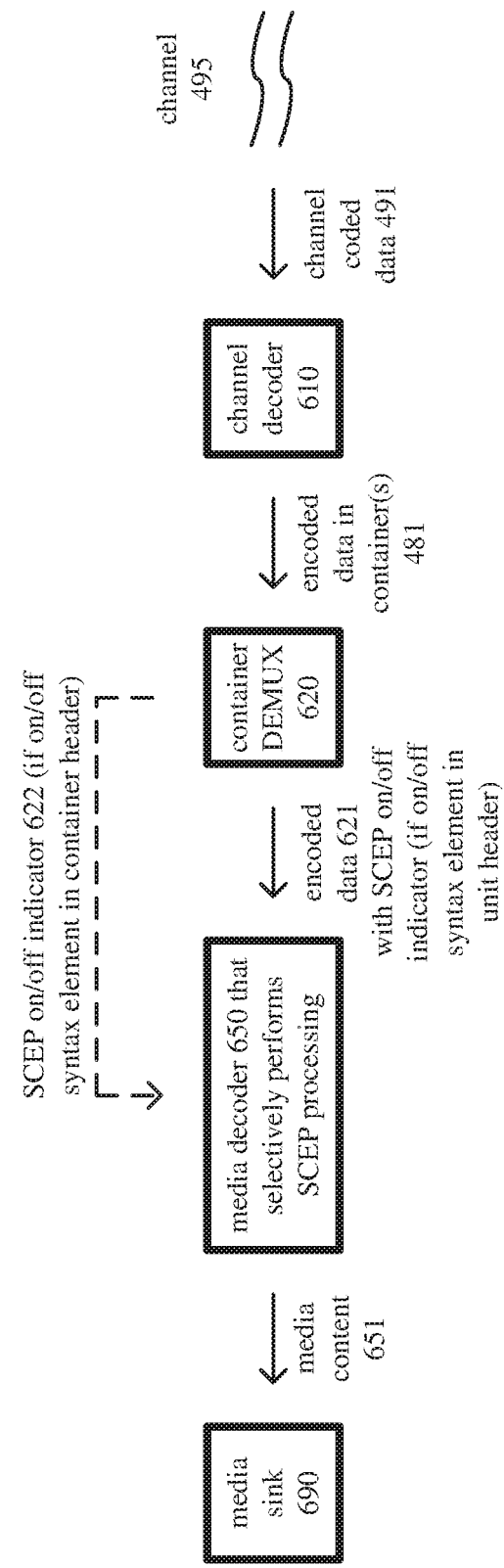
FIGS. 6 and 7 are diagrams illustrating an example media decoder system and example video decoder system, respectively, in conjunction with which some described embodiments can be implemented.
Figure 7:
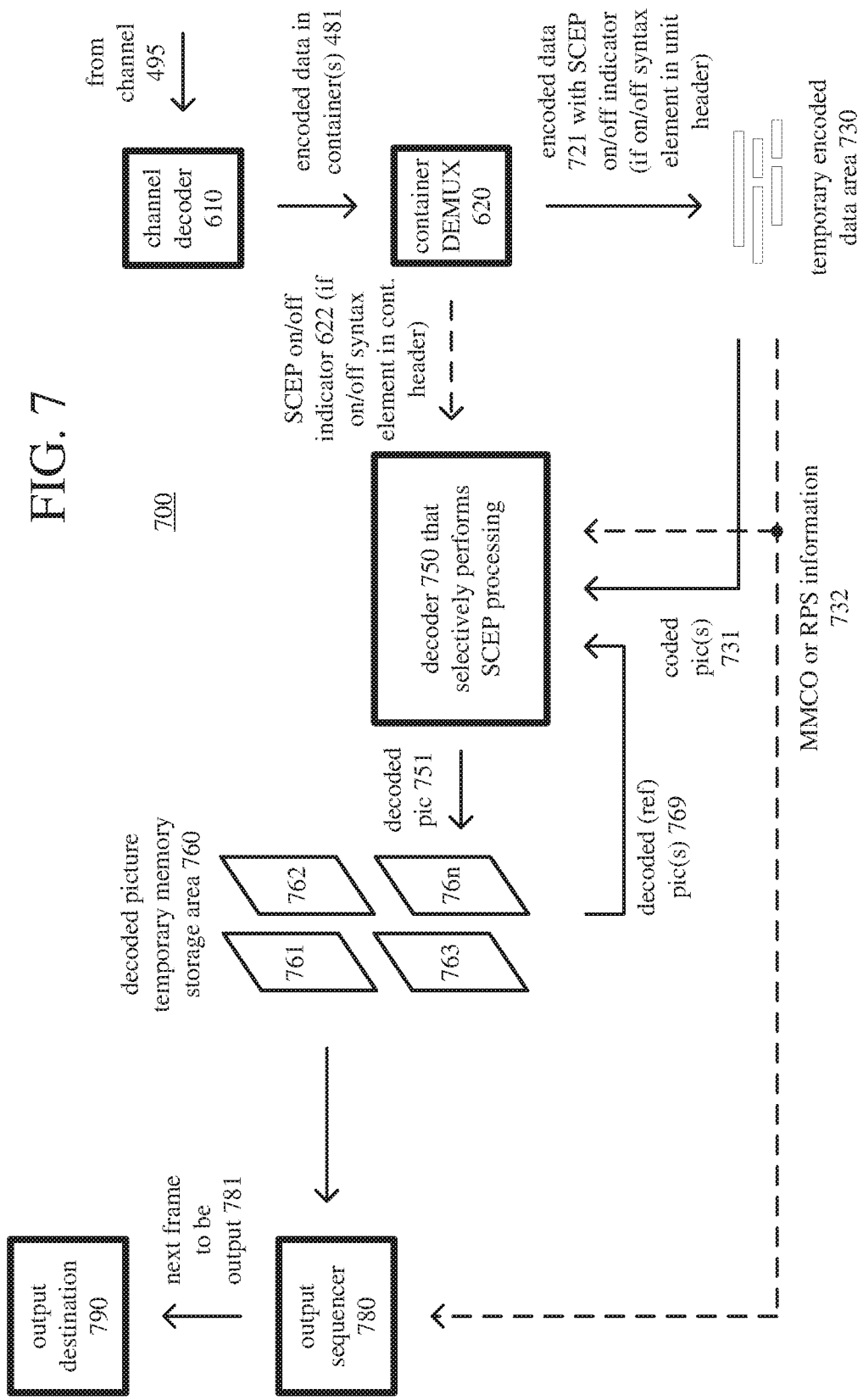

An RTC tool (210) manages encoding by one or more encoders (220). FIG. 4 shows an example media encoder system (400) that can be included in the RTC tool (210), and FIG. 5 shows an example video encoder system (500) that can be included in the RTC tool (210). Alternatively, the RTC tool (210) includes other and/or additional encoder systems. An RTC tool (210) also manages decoding by one or more decoders (270). FIG. 6 shows an example media decoder system (600) that can be included in the RTC tool (210), and FIG. 7 shows an example video decoder system (700) that can be included in the RTC tool (210). Alternatively, the RTC tool (210) includes other and/or additional decoder systems.

In the network environment (202) shown in FIG. 2b, an encoding tool (212) includes an encoder (220) that encodes media for delivery to multiple playback tools (214), which include decoders (270), for unidirectional communication. As indicated above, the encoder (220) can be a video encoder, audio encoder, or other type of media encoder, and the decoder (270) can be a video decoder, audio decoder, or other type of media decoder. The unidirectional communication can be provided for a video surveillance system, web camera monitoring system, remote desktop conferencing presentation or sharing, wireless screen casting, cloud computing or gaming, or other scenario in which media is encoded and sent from one location to one or more other locations. The encoding tool (212) can include multiple encoders for different media types, and each of the playback tools (214) can include multiple decoders for different media types. Although the network environment (202) in FIG. 2b includes two playback tools (214), the network environment (202) can include more or fewer playback tools (214). In general, a playback tool (214) communicates with the encoding tool (212) to determine one or more streams of media for the playback tool (214) to receive. The playback tool (214) receives the stream(s), buffers the received encoded data for an appropriate period, and begins decoding and playback.

FIG. 4 shows an example media encoder system (400) that can be included in the encoding tool (212), and FIG. 5 shows an example video encoder system (500) that can be included in the encoding tool (212). Alternatively, the encoding tool (212) includes other and/or additional encoder systems. The encoding tool (212) can also include server-side controller logic for managing connections with one or more playback tools (214). A playback tool (214) can include client-side controller logic for managing connections with the encoding tool (212). FIG. 6 shows an example media decoder system (600) that can be included in the playback tool (214), and FIG. 7 shows an example video decoder system (700) that can be included in the playback tool (214). Alternatively, the playback tool (214) includes other and/or additional decoder systems.

III. Innovations in Selective Use of Start Code Emulation Prevention.

This section describes various innovations in selectively using start code emulation prevention ("SCEP") on encoded data for media content.

A. SCEP Processing.

A media, codec standard or format defines rules for organizing encoded data in a media elementary stream format. Typically, encoded data is organized as units. Some codec standards and formats use start codes to demarcate the beginnings and ends of separate units of encoded data in a bitstream. In general, a start code is a sequence of bits that only appears in the encoded data when marking the start of a unit of encoded data. If a decoder starts decoding in the middle of a bitstream, or if a decoder loses synchronization when parsing a bitstream (e.g., because of loss or corruption of encoded data), the decoder can locate the next start code in the bitstream and begin parsing encoded data from that position, which is the start of some type of unit according to the codec standard or format. A start code can also include an identifier for the type of unit that follows the start code.

FIG. 3a shows an example bitstream (300) in which a start code (310) is followed by encoded data (320) for a unit n of media content. Later in the bitstream (300), another start code (312) is followed by encoded data (322) for the subsequent unit n+1. Each of the start codes (310, 312) in FIG. 3a begins with the three-byte prefix 0x000001, which is 00000000 00000000 00000001 in binary. This start code prefix is consistent with start code prefix values according to the SMPTE 42111 standard, H.264 standard, and H.265 standard. Each of the start codes (310, 312) in FIG. 3a includes a fourth byte, which includes a type identifier for the unit that follows the start code (310, 312). This one-byte suffix in the start codes (310, 312) of FIG. 3a is consistent with the SMPTE 421M standard and 1-1.264 standard, although in the H.264 standard the one-byte suffix is counted as the first byte of a network abstraction layer ("NAL") unit. For the H.265 standard, a start code prefix 0x000001 is followed by two bytes of a NAL unit header, which includes a type identifier for the NAL unit.

When parsing the example bitstream (300), a decoder typically scans encoded data in the example bitstream (300) to identify the start codes (310, 312, and so on), and thereby determine lengths of units of encoded data (320, 322, and so on). A decoder may also scan for the next start code if synchronization or byte alignment has been lost. Encoded data can be scanned byte-after-byte, with start codes aligned with byte boundaries. If synchronization is lost, byte alignment may also be lost. In this case, a decoder may scan bit-after-bit for a pattern such as a zero-value byte followed by a start code in order to recover byte alignment.

In the example bitstream (300), encoded data (320, 322) includes values for different parameters, one value after another. This can cause a problem if, inadvertently, some combination of values matches (emulates) a start code. In FIG. 3a, for example, the encoded data (320) for unit n includes an emulated start code (330). In the emulated start code (330), a three-byte series of bits, by coincidence, matches the start code prefix 0x000001 of the start codes (310, 312). (The fourth byte of the emulated start code (330) does not match, but that is not relevant because a decoder would incorrectly assume the start code prefix 0x000001 indicates the beginning of a valid start code.)

To manage this situation, an encoder uses SCEP. The encoder scans the encoded data (320, 322, and so on) to identify any pattern of bits that inadvertently matches (emulates) a start code. The encoder then disrupts this pattern. FIG. 3h shows an example bitstream (301), which includes a SCEP byte (340) added to disrupt the emulated start code (330) of the bitstream (300) of FIG. 3a. The SCEP byte (340) has a value of 0x03, which is 00000011 in binary. This value of SCEP byte (340) is consistent with SCEP byte values according to the SMPTE 421M standard, H.264 standard, and 11,265 standard. For a bitstream defined according to the SMPTE 421M standard, H.264 standard, or H.265 standard, a SCEP byte of 00000011 is inserted whenever the bit pattern 00000000 00000000 000000xx (where xx represents any two-bit pattern) is encountered. That bit pattern is replaced with 00000000 00000000 00000011 000000xx, where 00000011 is the SCEP byte. As illustrated in FIGS. 3a and 3b, emulation of the start code prefix of 23 zeros followed by a one in the emulated start code (330) is disrupted, since the replacement pattern includes 22 zeros followed by a one.

To undo SCEP for decoding, after start codes are located to identify unit boundaries, a corresponding decoder removes SCEP bytes that have been added. For example, the decoder scans the encoded data (320, 322, and so on) to locate start codes (310, 312, and so on) for the respective units of encoded data. While the valid start codes (310, 312, and so on) are being located, the SCEP byte (340) breaks up the emulated start code (330) of FIG. 3a. After determining the encoded data (320) for unit n, but before starting to parse the encoded data (320), the decoder scans the encoded data (320) of unit n to find any occurrences of the bit pattern 00000000 00000000 00000011 000000xx. The decoder finds one occurrence of that pattern, which includes the SCEP byte (340) shown in FIG. 3b, and removes the SCEP byte (340). This leaves the bits 00000000 00000000 00000001, for the original bit pattern of encoded data in the encoded data (320) of unit n.

SCEP bytes provide an effective way to prevent emulation of start codes within encoded data. Using SCEP bytes adds processing overhead in two stages, however. First, during or after encoding, an encoder scans encoded data, or otherwise tracks encoded data for output, in order to identify any pattern that should be disrupted with a SCEP byte. Second, before decoding a given unit of encoded data, a decoder scans the encoded data to identify any pattern from which a SCEP byte should be removed. Although the operation of inserting or removing a SCEP byte is simple, scanning encoded data on a byte-by-byte basis for occurrences of relevant bit patterns can require significant resources. Also, SCEP bytes increase the amount of data in a bitstream. For some units (e.g., units with encoded data in which the pattern 0x000000 is common), the increase in bit rate due to SCEP bytes can be significant. In some cases, adding SCEP bytes increases bit rate by 10% or even more.

B. Selective Use of SCEP Depending on Start Code Usage.

Units of encoded data in a media elementary stream format can be delivered from an encoder to a decoder in various ways. Typically, units of encoded data are packed into "containers" according to a container format. For example, encoded data can be organized for transmission or storage as a media stream (e.g., according to a media program stream or transport stream format such as ITU-T H.222.01ISO/IEC 13818-1 or an Internet real-time transport protocol format such as IETF RFC 3550), organized for storage as a file (e.g., according to a media container format such as ISO/IEC 14496-12), or otherwise organized according to a multiplexing protocol or transport protocol. For some container formats (such as ISO/IEC 13818-1, which is also called MPEG-TS), start codes in the media elementary stream format indicate the beginnings and ends units of encoded data. For example, start codes demarcate boundaries of NAL units that include encoded data for video content. For encoded data delivered with start codes, emulation of start codes is potentially problematic because it will prevent correct identification of boundaries of NAL units. For other container formats (such as ISO/IEC 14496-12, which is also called MP4), units of encoded data are organized by sample (e.g., by frame for video), and the length of the encoded data for a sample is specified according to the container format. In this case, start codes are not needed to identify the beginnings and ends of units of encoded data. Rather, syntax elements in the container format suffice to identify boundaries of units of encoded data.

Encoded data in a media elementary stream format can be packaged into containers of one container format after the encoded data is created, then re-packaged into containers of a different container format at some later time. The same encoded data can potentially be re-packaged into containers of different container formats an arbitrary number of times, with some container formats requiring the use of start codes for the encoded data to be delivered, and other container formats not requiring the use of start codes for the encoded data to be delivered. Considering the different ways that encoded data can be delivered, for the sake of inter-operability, some video codec standards (such as the SMPTE 421M standard, H.264 standard, and H.265 standard) mandate that SCEP processing (as described in the previous section) be performed on encoded data in a video elementary stream format. This ensures that the encoded data in the video elementary stream format, regardless of container format and regardless of whether start codes are actually used, does not contain emulated start codes. As explained above, however, scanning operations for SCEP after encoding and again before decoding can consume significant processing resources, and adding SCEP bytes can increase bit rate significantly.

SCEP processing can be selectively performed when delivering encoded data for media content, depending on whether start codes are used. For example, if encoded data is delivered using a container format (such as MPEG-TS) or other mode that requires the use of start codes to identify boundaries of units of encoded data, SCEP processing is performed in order to prevent emulation of start codes. In this case, SCEP processing (including at least scanning operations) is performed regardless of whether or not emulated start codes are actually present in the encoded data. On the other hand, encoded data may be delivered using a container format (such as MP4) or other mode that signals the beginnings and ends of units of encoded data by some other mechanism (e.g., length values in containers). If start codes are not used to identify boundaries of units of encoded data, SCEP processing can be skipped. In this case, SCEP processing is skipped regardless of whether or not emulated start codes are actually present in the encoded data. Skipping SCEP processing in these scenarios can lower bit rate (by avoiding introduction of SCEP bytes) and reduce computational overhead (by skipping scanning operations).

C. Selective Use of SCEP Depending on Occurrence of Emulated Start Codes.

Alternatively, SCEP processing can be selectively performed when delivering encoded data for media content, depending on whether emulated start codes are actually present in encoded data. For example, when start codes identify boundaries of units of encoded data, scanning operations for SCEP processing are performed in order to identify emulated start codes, and a SCEP byte is inserted to disrupt any emulated start code. If a unit of encoded data includes at least one emulated start code, the value of a syntax element in the bitstream for that unit indicates SCEP processing should be performed to remove the SCEP byte(s) that were inserted. On the other hand, if a unit of encoded data includes no emulated start codes, the value of a syntax element in the bitstream for that unit indicates SCEP processing should be skipped. Skipping SCEP processing for such units can reduce computational overhead by skipping scanning operations before decoding.

Further, SCEP processing can be selectively performed depending on whether start codes are used and depending on whether emulated start codes are actually present in encoded data. For example, when start codes identify boundaries of units of encoded data, scanning operations for SCEP processing are performed in order to identify emulated start codes, and a SCEP byte is inserted to disrupt any emulated start code. If a unit of encoded data includes at least one emulated start code, the value of a syntax element in the bitstream for that unit indicates SCEP processing should be performed to remove the SCEP byte(s) that were inserted. On the other hand, if a unit of encoded data includes no emulated start codes, or if start codes are not used to identify boundaries of units of encoded data (regardless of whether any emulated start codes are actually present in the encoded data), the value of a syntax element in the bitstream for that unit indicates SCEP processing should be skipped.

D. Example Media Encoder Systems.

FIG. 4 shows an example media encoder system (400) in conjunction with which some described embodiments may be implemented. The media encoder system (400) includes a media encoder (340) that selectively performs SCEP processing on encoded data to add SCEP bytes to the encoded data.

Overall, the media encoder system (400) receives media content (411) from a media source (410) and produces encoded data, as output to a channel (495). The media source (410) produces media content (411). Typically, the media source (410) produces the media content (411) in a time series. For images or video, the media source (410) can be a camera, tuner card, storage media, screen capture module, or other digital video source. For audio, the media source (410) can be a microphone or other digital audio source.

The SCEP controller (420) decides whether or not SCEP processing is to be applied to encoded data. For example, the SCEP controller (420) evaluates a user setting or application setting that controls whether SCEP processing is to be applied to encoded data. Or, the SCEP controller (420) evaluates a container format that will be used for the encoded data, e.g., determining whether length information for units of encoded data will be signaled as part of the container format, or whether start codes will be used to identify boundaries between units of encoded data. The SCEP controller (420) transmits a control signal (421) to the encoder (440) to indicate whether SCEP processing is on or off.

The media encoder (440) encodes media content (411) to produce encoded data (441) in a media elementary stream format. The details of the encoding depend on the media type, relevant codec standard or format, and implementation choices. The media encoder (440) selectively performs SCEP processing on encoded data. The media encoder (440) can selectively perform SCEP processing depending on whether start codes are used (see section and/or depending on whether emulated start codes are actually present in encoded data (see section III.C).

The encoded data (441) in the media elementary stream format includes syntax elements organized as syntax structures. In general, a syntax element can be any element of data, and a syntax structure is zero or more syntax elements in the bitstream in a specified order. The size of a given unit of encoded data (in bytes) is typically indicated outside the unit. For example, the size of a given unit is determined before decoding by counting the number of bytes between two start codes in the bitstream, one start code immediately preceding the given unit and the other start code immediately preceding the next unit. Or, using length information available from syntax elements of a container format, the size of a unit can be determined without using start codes. In some implementations, the media elementary stream format includes an indicator of whether or not a corresponding decoder should perform SCEP processing on the encoded data. Such a SCEP on/off indicator can be signaled as a value of a syntax element in a header of a unit according to the media elementary stream format.

The encoded data (441) is processed by a container format multiplexer ("container MUX") (480), producing encoded data in one or more containers (481). The container MUX (480) can packetize and/or multiplex the encoded data for transmission or storage as a media stream (e.g., according to a media program stream or transport stream format such as ITU-T H.222.01 ISO/IEC 13818-1 or an Internet real-time transport protocol format such as IETF RFC 3550), in which case the container MUX (480) can add syntax elements as part of the syntax of the media transmission stream. Or, the container MUX (480) can organize the encoded data for storage as a file (e.g., according to a media container format such as ISO/IEC 14496-12), in which case the container MUX (480) can add syntax elements as part of the syntax of the media storage file. Or, more generally, the container MUX (480) can implement one or more media system multiplexing protocols or transport protocols, in which case the container MUX (480) can add syntax elements as part of the syntax of the protocol(s). In some implementations, a container produced by the container MUX (480) includes an indicator of whether or not a corresponding decoder should perform SCEP processing on encoded data. Such a SCEP on/off indicator can be signaled as a value of a syntax element in a header of a container. In this case, the SCEP controller (420) or media encoder (440) can transmit a control signal to the container MUX (480), providing the value of the SCEP on/off indicator (422).

The container MUX (480) provides the encoded data in the container(s) (481) to a channel encoder (490), which provides channel-coded data (491) as output to a channel (495). The channel (495) represents storage, a communications connection, or another type of channel for the output. The channel encoder (490) or channel (495) may include elements (not shown), e.g., for forward-error correction ("FEC") encoding and analog signal modulation.

FIG. 5 shows an example video encoder system (500) in conjunction with which some described embodiments may be implemented. The video encoder system (500) includes a video encoder (540) that selectively performs SCEP processing on encoded data to add SCEP bytes to the encoded data.

Overall, the video encoder system (500) receives a sequence of source video pictures (511) from a video source (510) and produces encoded data as output to a channel (495). The video source (510) can be a camera, tuner card, storage media, screen capture module, or other digital video source. The video source (510) produces a sequence of video pictures at a frame rate of, for example, 30 frames per second.

An arriving source picture (511) is stored in a source picture temporary memory storage area (520) that includes multiple picture buffer storage areas (521, 522, . . . 52n). After one or more of the source pictures (511) have been stored in picture buffers (521, 522, etc.), a picture selector (530) selects an individual source picture from the source picture storage area (520) to encode as the current picture (531). Before the video encoder (540), the video encoder system (500) can include a pre-processor (not shown) that performs pre-processing (e.g., filtering, color space conversion, chroma sub-sampling) of the current picture (531).

The SCEP controller (420) decides whether or not SCEP processing is to be performed, as described with reference to FIG. 4. The SCEP controller (420) transmits a control signal (421) to the encoder (540) to indicate whether SCEP processing is on or off.

The video encoder (540) encodes the current picture (531) to produce a coded picture (541) in a video elementary stream format. The video encoder (540) receives the current picture (531) as an input video signal and produces encoded data for the coded picture (541) in a bitstream as output. Generally, the video encoder (540) includes multiple encoding modules that perform encoding tasks such as partitioning into tiles, intra-picture prediction estimation and prediction, motion estimation and compensation, frequency transforms, quantization, and entropy coding. The exact operations performed by the video encoder (540) can vary depending on compression format and can also vary depending on encoder-optional implementation decisions. The format of the output encoded data can be a Windows Media Video format, SMPTE 421M format, MPEG-x format (e.g., MPEG-1, MPEG-2, or MPEG-4), H.26x format (e.g., H.261, H.262, H.263, 11.264, H.265), or VPx format, or a variation or extension thereof, or some other format. The video encoder (540) selectively applies SCEP to encoded data. The video encoder (540) can selectively perform SCEP processing depending on whether start codes are used (see section III.B) and/or depending on whether emulated start codes are actually present in encoded data (see section III.C).

The encoded data in the video elementary stream format includes syntax elements organized as syntax structures. In the H.264 standard and H.265 standard, a network abstraction layer ("NAL") unit is a syntax structure that contains (1) an indication of the type of data to follow and (2) a series of zero or more bytes of the data. The size of a NAL unit (in bytes) is indicated outside the NAL unit. For example, the size of a NAL unit is determined before decoding by counting the number of bytes between two start codes. Or, using length information available from syntax elements of a container format, the size of a NAL unit can be determined without using start codes. In some implementations, the video elementary stream format includes an indicator of whether or not a corresponding decoder should perform SCEP processing on the encoded data. Such a SCEP on/off indicator can be signaled as a value of a syntax element in a header of a unit according to the video elementary stream format. FIGS. 11, 12a, and 12b illustrate examples of SCEP on/off indicators in headers of NAL units.

As shown in FIG. 5, the video encoder (540) also produces memory management control operation ("MMCO") signals (542) or reference picture set ("RPS") information. The RPS is the set of pictures that may be used for reference in motion compensation for a current picture or any subsequent picture. If the current picture (531) is not the first picture that has been encoded, when performing its encoding process, the video encoder (540) may use one or more previously encoded/decoded pictures (569) that have been stored in a decoded picture temporary memory storage area (560). Such stored decoded pictures (569) are used as reference pictures for inter-picture prediction of the content of the current picture (531). The MMCO/RPS information (542) indicates to a video decoder which reconstructed pictures may be used as reference pictures, and hence should be stored in a picture storage area.

The decoding process emulator (550) implements some of the functionality of a video decoder, for example, decoding tasks to reconstruct reference pictures. In a manner consistent with the MMCO/RPS information (542), the decoding process emulator (550) determines whether a given coded picture (541) needs to be reconstructed and stored for use as a reference picture in inter-picture prediction of subsequent pictures to be encoded. If a coded picture (541) needs to be stored (and possibly modified), the decoding process emulator (550) models the decoding process that would be conducted by a video decoder that receives the coded picture (541) and produces a corresponding decoded picture (551). The decoding process emulator (550) may be implemented as part of the video encoder (540).

The decoded picture temporary memory storage area (560) includes multiple picture buffer storage areas (561, 562, . . . , 56n). The decoding process emulator (550) manages the contents of the storage area (560) in order to identify any picture buffers (561, 562, etc.) with pictures that are no longer needed by the video encoder (540) for use as reference pictures. After modeling the decoding process, the decoding process emulator (550) stores a newly decoded picture (551) in a picture buffer (561, 562, etc.) that has been identified in this manner.

As shown in FIG. 5, the coded picture (541) and MMCO/RPS information (542) are buffered in a temporary encoded data area (570). The encoded data that is aggregated in the encoded data area (570) contains, as part of the syntax of the video elementary stream format, encoded data for one or more pictures. The encoded data that is aggregated in the encoded data area (570) can also include media metadata relating to the encoded video data (e.g., as one or more parameters in one or more supplemental enhancement information ("SEI") messages or video usability information ("VUI") messages).

The aggregated data (571) from the temporary encoded data area (570) is processed by the container MUX (480), producing encoded data in one or more containers (481). The container MUX (480) generally operates as described with reference to FIG. 4. In some implementations, a container produced by the container MUX (480) includes an indicator of whether or not a decoder should perform SCEP processing on the encoded data. Such a SCEP on/off indicator can be signaled as a value of a syntax element in a header of a container. In this case, the SCEP controller (420) or video encoder (540) can transmit a control signal to the container MUX (480), providing the value of the SCEP on/off indicator (422). As explained with reference to FIG. 4, the container MUX (480) provides the encoded data in the container(s) (481) to a channel encoder (490), which provides channel-coded data (491) as output to a channel (495).

The media encoder system (400) or video encoder system (500) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The media encoder system (400) or video encoder system (500) can be adapted for encoding of a particular type of content. The media encoder system (400) or video encoder system (500) can be implemented as part of an operating system module, as part of an application library, as part of a standalone application, or using special-purpose hardware.

Depending on implementation and the type of compression desired, modules of the media encoder system (400) and video encoder system (500) can be added, omitted, split into multiple modules, combined with other modules, and/or replaced with like modules. In alternative embodiments, encoder systems with different modules and/or other configurations of modules perform one or more of the described techniques. Specific embodiments of encoder systems typically use a variation or supplemented version of the media encoder system (400) or video encoder system (500). The relationships shown between modules within the media encoder system (400) and video encoder system (500) indicate general flows of information in the media encoder system (400) and video encoder system (500), respectively; other relationships are not shown for the sake of simplicity. In general, a given module of the media encoder system (400) or video encoder system (500) can be implemented by software executable on a CPU, by software controlling special-purpose hardware (e.g., graphics hardware for video acceleration), or by special-purpose hardware (e.g., in an ASIC).

E. Example Media Decoder Systems.

FIG. 6 shows an example media decoder system (600) in conjunction with which some described embodiments may be implemented. The media decoder system (600) includes a media decoder (650) that selectively performs SCEP processing on encoded data to remove SCEP bytes from the encoded data.

Overall, the media decoder system (600) receives encoded data from a channel (495) and produces reconstructed media content (651) for an output destination, which is shown in FIG. 6 as a media sink (690). The channel (495) represents storage, a communications connection, or another type of channel. The channel (495) produces channel-coded data (491) to a channel decoder (610). The channel (495) or channel decoder (610) may include elements (not shown), e.g., for FEC decoding and analog signal demodulation. The channel decoder (610) produces encoded data in one or more containers (481) to a container format demultiplexer ("container DEMUX") (620).

The container DEMUX (620) processes the encoded data in container(s) (481), producing encoded data (621) in a media elementary stream format. The container DEMUX (620) can de-packetize and/or demultiplex encoded data that has been organized for transmission or storage as a media stream (e.g., according to a media program stream or transport stream format such as ITU-T H.222.01 ISO/IEC 13818-1 or an Internet real-time transport protocol format such as IETF RFC 3550), in which case the container DEMUX (620) can parse syntax elements added as part of the syntax of the media transmission stream. Or, the container DEMUX (620) can separate encoded data that has been organized for storage as a file (e.g., according to a media container format such as ISO/IEC 14496-12), in which case the container DEMUX (620) can parse syntax elements added as part of the syntax of the media storage file Or, more generally, the container DEMUX (620) can implement one or more media system demultiplexing protocols or transport protocols, in which case the container DEMUX (620) can parse syntax elements added as part of the syntax of the protocol(s). In some implementations, a container processed by the container DEMUX (620) includes an indicator of whether or not the media decoder (650) should perform SCEP processing on the encoded data. Such a SCEP on/off indicator can be signaled as a value of a syntax element in a header of a container. In this case, the container DEMUX (620) can transmit a control signal to the media decoder (650), providing the value of the SCEP on/off indicator (622).

The encoded data (621) in the media elementary stream format includes syntax elements organized as syntax structures. The size of a given unit of encoded data (in bytes) is typically indicated outside the unit. For example, the media decoder system (600) determines the size of a given unit before decoding by counting the number of bytes between two start codes in the bitstream, where one start code immediately precedes the given unit and the other start code immediately precedes the next unit. Or, using length information available from syntax elements of a container format, the media decoder system (600) determines the size of a unit without using start codes. In some implementations, the media elementary stream format includes an indicator of whether the media decoder (650) should perform. SCEP processing on the encoded data. Such a SCEP on/off indicator can be signaled as a value of a syntax element in a header of a unit according to the media elementary stream format.

The media decoder (650) decodes the encoded data (621) in the media elementary stream format to provide reconstructed media content (651) to the media sink (690). The details of the decoding depend on the media type, relevant codec standard or format, and implementation choices. Before decoding, the media decoder (650) selectively performs SCEP processing on the encoded data (621), removing any SCEP bytes from the encoded data (621) and thereby reversing any SCEP processing applied after encoding. Whether the media decoder (650) performs SCEP processing depends on the value of the SCEP on/off indicator in a unit header (for implementations in which the SCEP on/off indicator is part of the media elementary stream format) or container header (for implementations in which the SCEP on/off indicator is part of the container format).

FIG. 7 shows an example video decoder system (700) in conjunction with which some described embodiments may be implemented. The video decoder system (700) includes a video decoder (750), which selectively performs SCEP processing on encoded data to remove SCEP bytes from the encoded data.

Overall, the video decoder system (700) receives channel-coded data from a channel (495) and produces reconstructed pictures as output for an output destination (790). As explained with reference to FIG. 6, the channel decoder (610) receives channel-coded data from the channel (495) and provides encoded data in one or more containers (481) to the container DEMUX (620). The container DEMUX (620) processes the encoded data in container(s) (481), producing encoded data (721) in a video elementary stream format. The container DEMUX (620) generally operates as described with reference to FIG. 6. In some implementations, a container processed by the container DEMUX (620) includes an indicator of whether or not the video decoder (750) should perform SCEP processing on the encoded data. Such a SCEP on/off indicator can be signaled as a value of a syntax element in a header of a container. In this case, the container DEMUX (620) can transmit a control signal to the video decoder (750), providing the value of the SCEP on/off indicator (622).

The encoded data (721) that is output from the container DEMUX (620) is stored in a temporary encoded data, area (730) until a sufficient quantity of such data has been received. The encoded data (721) includes coded pictures (731) and MMCO/RPS information (732). The encoded data (721) in the encoded data area (730) contain, as part of the syntax of an elementary coded video bitstream, encoded data for one or more pictures. The encoded data (721) in the encoded data area (730) can also include media metadata relating to the encoded video data (e.g., as one or more parameters in one or more SEI messages or VIII messages).

The encoded data (721) in the video elementary stream format includes syntax elements organized as syntax structures. The size of a given unit of encoded data (in bytes) is typically indicated outside the unit. For example, the video decoder system (700) determines the size of a given unit before decoding by counting the number of bytes between two start codes in the bitstream, where one start code immediately precedes the given unit and the other start code immediately precedes the next unit. Or, using length information available from syntax elements of a container format, the video decoder system (700) determines the size of a unit without using start codes. In some implementations, the video elementary stream format includes an indicator of whether the video decoder (750) should perform SCEP processing on the encoded data. Such a SCEP on/off indicator can be signaled as a value of a syntax element in a header of a unit according to the video elementary stream format. FIGS. 11, 12a, and 12b illustrate examples of SCEP on/off indicators in headers of units of encoded data.

In general, the encoded data area (730) temporarily stores encoded data (721) until such encoded data (721) is used by the video decoder (750). At that point, encoded data for a coded picture (731) and MMCO/RPS information (732) are transferred from the encoded data area (730) to the video decoder (750). As decoding continues, new encoded data is added to the encoded data area (730) and the oldest encoded data remaining in the encoded data area (730) is transferred to the video decoder (750).

The video decoder (750) decodes a coded picture (731) to produce a corresponding decoded picture (751). The video decoder (750) receives the coded picture (731) as input as part of a bitstream, and the video decoder (750) produces the corresponding decoded picture (751) as output as reconstructed video. Generally, the video decoder (550) includes multiple decoding modules that perform decoding tasks such as entropy decoding, inverse quantization, inverse frequency transforms, motion compensation, intra-picture prediction, and filtering. The exact operations performed by those components can vary depending on the type of information being decompressed. The video elementary stream format of the bitstream can be a Windows Media Video format, SMPTE 421M format, MPEG-x format (e.g., MPEG-1, MPEG-2, or MPEG-4), H.26x format (e.g., H.261, H.262, H.263, H.264, H.265), or VPx format, or variation or extension thereof, or another format. Before decoding, the video decoder (750) selectively performs SCEP processing on the encoded data (721), removing any SCEP bytes from the encoded data (721) and thereby reversing any SCEP processing applied after encoding. Whether the video decoder (750) performs SCEP processing depends on the value of the SCEP on/off indicator in a unit header (for implementations in which the SCEP on/off indicator is part of the video elementary stream format) or container header (for implementations in which the SCEP on/off indicator is part of the container format).

As appropriate, when performing its decoding process, the video decoder (750) may use one or more previously decoded pictures (769) as reference pictures for inter-picture prediction. The video decoder (750) reads such previously decoded pictures (769) from a decoded picture temporary memory storage area (760). The decoded picture temporary memory storage area (760) includes multiple picture buffer storage areas (761, 762, . . . , 76n). The decoder (750) uses the MMCO/RPS information (732) to identify a picture buffer (761, 762, etc.) in which it can store a decoded picture (751). The decoder (750) stores the decoded picture (751) in that picture buffer. In a manner consistent with the MMCO/RPS information (732), the decoder (750) also determines whether to remove any reference pictures from the multiple picture buffer storage areas (761, 762, . . . , 76n).

An output sequencer (780) identifies when the next picture to be produced in display order (also called output order) is available in the decoded picture storage area (760). When the next picture (781) to be produced in display order is available in the decoded picture storage area (760), it is read by the output sequencer (780) and output to the output destination (790) (e.g., display).

The media decoder system (600) or video decoder system (700) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The media decoder system (600) or video decoder system (700) can be implemented as part of an operating system module, as part of an application library, as part of a standalone application or using special-purpose hardware.

Depending on implementation and the type of decompression desired, modules of the media decoder system (600) and/or video decoder system (700) can be added, omitted, split into multiple modules, combined with other modules, and/or replaced with like modules. In alternative embodiments, decoder systems with different modules and/or other configurations of modules perform one or more of the described techniques. Specific embodiments of decoder systems typically use a variation or supplemented version of the media decoder system (600) or video decoder system (700). The relationships shown between modules within the media decoder system (600) and video decoder system (700) indicate general flows of information in the media decoder system (600) and video decoder system (700), respectively; other relationships are not shown for the sake of simplicity. In general, a given module of the media decoder system (600) or video decoder system (700) can be implemented by software executable on a CPU, by software controlling special-purpose hardware (e.g., graphics hardware for video acceleration), or by special-purpose hardware (e.g., in an ASIC).

F. Example Bitstream Rewriting Systems.

Figure 8:
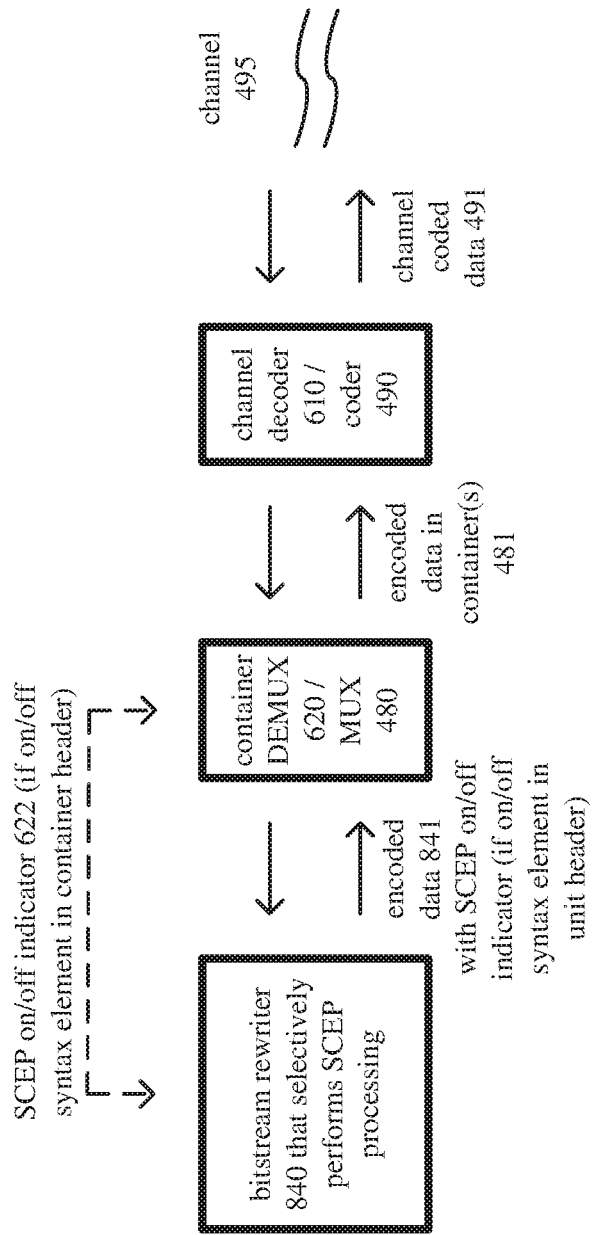
FIG. 8 is a diagram illustrating an example bitstream rewriting system in conjunction with which some described embodiments can be implemented.

FIG. 8 shows an example bitstream rewriting system (800) in conjunction with which some described embodiments may be implemented. The bitstream rewriting system (800) includes a bitstream rewriter (840), which selectively performs SCEP processing to add SCEP bytes to encoded data or remove SCEP bytes from encoded data. When SCEP bytes have been added to encoded data in a bitstream, the bitstream rewriting system (800) can remove the SCEP bytes. Or, when SCEP bytes have not been added to encoded data in a bitstream, the bitstream rewriting system (800) can add SCEP bytes to the encoded data in the bitstream. The bitstream rewriting system (800) can selectively perform SCEP processing on encoded data when, for example, the encoded data is unpacked from containers of one container format and packed into containers of a different container format.

Overall, the bitstream rewriting system (800) receives encoded data as input from the channel (495), performs bitstream rewriting, and produces encoded data as output to the channel (495). The channel (495), channel decoder (610), and container DEMUX (620) operate as explained with reference to FIG. 6. The channel (495) produces channel-coded data (491) to the channel decoder (610), which in turn produces encoded data in one or more containers (481) to the container DEMUX (620). The container DEMUX (620) processes the encoded data in container(s) (481), producing encoded data (841) in a media elementary stream format. If a container processed by the container DEMUX (620) includes an indicator of whether to perform SCEP processing on encoded data, the container DEMUX (620) can transmit a control signal to the bitstream rewriter (840), providing the value of the SCEP on/off indicator (622). Otherwise, the media elementary stream format can include a value of a syntax element for a SCEP on/off indicator.

The bitstream rewriter (840) receives the encoded data (841) in the media elementary stream format and decides whether or not to perform SCEP processing on the encoded data (841). For example, the bitstream rewriter (840) evaluates a container format that will be used for the encoded data, e.g., determining whether length information for units of encoded data will be signaled as part of the container format. The bitstream rewriter (840) can check whether the SCEP on/off indicator from the media elementary stream or container is consistent with whether SCEP should or should not be applied to the encoded data (841). The bitstream rewriter (840) can then add or remove SCEP bytes, or leave the encoded data (841) unchanged. For example, if SCEP bytes have already been added to the encoded data (841) and should remain, or if SCEP bytes have not been added to the encoded data (841) and should not be added, the bitstream rewriter (840) makes no change to the encoded data (841) in the media elementary stream format. Otherwise, if SCEP bytes have already been added to the encoded data (841) but should be removed, the bitstream rewriter (840) can perform SCEP processing on the encoded data (841), scanning for any pattern that includes a SCEP byte and removing the SCEP byte. Finally, if SCEP bytes have not been added to the encoded data (841) but should be added, the bitstream rewriter (840) can perform SCEP processing on the encoded data (841), scanning for any pattern that emulates a start code and adding a SCEP byte to disrupt the pattern.

If the media elementary stream includes a SCEP on/off indicator, the bitstream rewriter (840) can change the value of the SCEP on/off indicator depending on whether the bitstream rewriter (840) added or removed. SCEP bytes. Otherwise, if a container includes a SCEP on/off indicator, the bitstream rewriter (840) can send a control signal (622) to the container DEMUX (620), providing the current value of the SCEP on/off indicator.

The container MUX (480) and channel coder (490) operate as explained with reference to FIG. 4. The container MUX (480) receives the encoded data (841) from the bitstream rewriter (840) and produces encoded data in one or more containers (481), which may, include a SCEP on/off indicator as a value of a syntax element in a header of a container. The container MUX (480) provides the encoded data in the container(s) (481) to the channel encoder (490), which provides channel-coded data (491) as output to a channel (495).

The bitstream rewriting system (800) can be implemented as part of an operating system module, as part of an application library, as part of a standalone application, or using special-purpose hardware. Depending on implementation and the type of processing desired, modules of the bitstream rewriting system (800) can be added, omitted, split into multiple modules, combined with other modules, and/or replaced with like modules. In alternative embodiments, bitstream rewriting system with different modules and/or other configurations of modules perform one or more of the described techniques. Specific embodiments of bitstream rewriting system typically use a variation or supplemented version of the bitstream rewriting system (800). The relationships shown between modules within the bitstream rewriting system (800) indicate general flows of information in the bitstream rewriting system (800); other relationships are not shown for the sake of simplicity. In general, a given module of the bitstream rewriting system (800) can be implemented by software executable on a CPU, by software controlling special-purpose hardware (e.g., graphics hardware for video acceleration), or by special-purpose hardware (e.g., in an ASIC).

G. Example Transmitter-Side Processing.

FIG. 9 shows a generalized technique (900) for selectively performing SCEP processing on encoded data after encoding. The technique (900) can be performed by a media encoder system as described with reference to FIG. 4 or 5, a bitstream rewriter system as described with reference to FIG. 8, or other media processing tool.

The media processing tool selectively performs (910) SCEP processing on encoded data for media content. The media content can be video content, audio content, image content, or some other type of media content. The media processing tool sets (920) a value of a syntax element that indicates whether or not to perform SCEP processing on the encoded data. For example, the syntax element is a one-bit flag. Alternatively, the syntax element is some other data type (e.g., unsigned integer, which may jointly indicate other information). FIGS. 10 and 11 illustrate example approaches (1000, 1100) to selectively performing SCEP processing and setting values of syntax elements for SCEP on/off indicators.

The media processing tool stores (930) the encoded data for output as part of a bitstream. The syntax element (for the SCEP on/off indicator) is signaled in association with the bitstream. For example, the syntax element is signaled in a header of a NAL unit that includes at least part of the encoded data. Or, the syntax element is signaled in a header, defined according to a container format, of a container that includes at least part of the encoded data. Or, the syntax element is signaled in a header, defined according to a media elementary stream format, for a frame of the media content. Alternatively, the syntax element is signaled in some other way.

The media processing tool checks (940) whether to continue for another unit of encoded data. If so, the media processing tool selectively performs (910) SCEP processing on the encoded data for the next unit and sets (920) the value of a syntax element (for a SCEP on/off indicator) for the next unit. In this way, the media processing tool can repeat the technique (900) on a unit-by-unit basis. The units of encoded data can be NAL units for the H.264 standard or H.265 standard. Or, the units of encoded data can be some other type of units for a media codec standard or format, e.g., one that abstracts network layer processing away from the media elementary stream.

Alternatively, for some units, the media processing tool can skip operations to determine whether or not to perform SCEP processing. For example, the media processing tool can determine whether or not to perform SCEP processing depending on start code usage when encoding or bitstream rewriting begins, and follow the decision for each unit after that. Also, depending on how a SCEP on/off indicator is signaled, for some types of units, the media processing tool can skip operations to set (920) the value of a syntax element for the SCEP on/off indicator. For example, a SCEP on/off indicator can be signaled only for some types of units (e.g., for a parameter set for a picture, for a parameter set for a sequence) then remain in effect until replaced with another SCEP on/off indicator.

A media encoder can receive the media content and encode the media content to produce the encoded data. In this case, the media encoder can also selectively perform (910) SCEP processing on the encoded data. If a SCEP on/off indicator is signaled as part of a media elementary stream format, the media encoder can set (920) the value of the syntax element in the media elementary stream. Otherwise, another component (e.g., a container MUX as described with reference to FIG. 4 or 5) can set (920) the value of the syntax element for a SCEP on/off indicator.

Alternatively, a bitstream rewriter can receive the encoded data, selectively, perform (910) SCEP processing on the encoded data, and set (920) the value of the syntax element for a SCEP on/off indicator.

There are several different approaches to determining whether or not to perform SCEP processing on the encoded data. The media processing tool can signal whether or not to perform SCEP processing on the encoded data depending on start code usage for the encoded data. Such an approach is proactive—the decision does not depend on whether emulated start codes are actually present or absent in units of the encoded data. The value of the syntax element that indicates whether or not to perform SCEP processing on the encoded data can be set based on a user setting or application setting that indicates whether start codes are used. For example, SCEP processing is performed on the encoded data if start codes are used. Or, the value of the syntax element that indicates whether or not to perform SCEP processing on the encoded data can be set based on the container format for the encoded data. For example, SCEP processing is performed on the encoded data if the container format lacks, for units of the encoded data, respectively, fields indicating lengths of the encoded data for the respective units, but skipped if the container format requires use of start codes to find boundaries between units of encoded data. In this way, SCEP processing can be avoided in media delivery scenarios in which start code searching is not used to find boundaries between units of encoded data.

FIG. 10 shows an example technique (1000) for proactive SCEP processing of encoded data, depending on start code usage. A media processing tool checks (1010) whether emulated start codes are a potential problem for the encoded data (e.g., checking which container format will be used). If so, the media processing tool performs (1030) SCEP processing on the encoded data, selectively adding SCEP bytes. For example, the media processing tool scans the encoded data and, upon detection of a pattern that emulates a start code, inserts a SCEP byte to disrupt the pattern. The media processing tool signals (1040) that SCEP processing is to be performed ("on"), setting values of syntax elements for SCEP on/off indicators in all relevant headers (e.g., unit headers, container headers) for the encoded data. Otherwise, if emulated start codes are not a potential problem for the encoded data, the media processing tool bypasses SCEP processing, skipping the scanning and insertion operations. The media processing tool signals (1020) that SCEP processing is not to be performed ("off"), setting values of syntax elements for SCEP on/off indicators in all relevant headers (e.g., unit headers, container headers) for the encoded data.

Alternatively, the media processing tool can signal whether or not to perform SCEP processing on the encoded data depending on presence or absence of emulated start codes in the encoded data. Such an approach is reactive—the decision depends on actual presence or absence of emulated start codes in respective units of the encoded data. For example, the media processing tool checks, on a unit-by-unit basis for the respective units of the encoded data, whether a given unit includes any pattern that emulates a start code. For one of the respective units of the encoded data, the value of the syntax element (for the SCEP on/off indicator) is set based on results of the checking for that unit of the encoded data. In this way, decoder-side SCEP processing can be avoided when emulated start codes are not present in encoded data.

FIG. 11 shows an example technique (1100) for reactive SCEP processing of encoded data, depending on presence of emulated start codes. The media processing tool gets (1110) a unit of encoded data and checks (1120) whether any SCEP bytes are needed to disrupt emulated start codes in the encoded data for the unit. If one or more SCEP bytes are needed to disrupt emulated start codes in the encoded data for the unit, the media processing tool adds (1140) one or more SCEP bytes to the encoded data for the unit. Thus, when selectively performing SCEP processing, the media processing tool scans the encoded data for the unit for emulated start codes and, upon detection of a pattern that emulates a start code, inserts a SCEP byte to disrupt the pattern. The media processing tool signals (1150) that SCEP processing is to be performed ("on") for the unit of encoded data, setting the value of a syntax element for a SCEP on/off indicator in the relevant header (e.g., unit header, container header) for the unit of encoded data. Otherwise, if no SCEP bytes are needed to disrupt emulated start codes in the encoded data for the unit, the media processing tool bypasses the insertion operations of SCEP processing and signals (1130) that SCEP processing is not to be performed ("off") for the unit of encoded data, setting the value of a syntax element for a SCEP on/off indicator in the relevant header (e.g., unit header, container header) for the unit of encoded data. The media processing tool checks (1160) whether to continue with the next unit and, if so, gets (1110) the next unit.

Alternatively, the media processing tool can consider other and/or additional factors when setting the value of the syntax element that indicates whether or not to perform SCEP processing on the encoded data.

H. Example Receiver-Side Processing.

FIG. 12 shows a generalized technique (1200) for selectively performing SCEP processing on encoded data before decoding. The technique (1200) can be performed by a media decoder system as described with reference to FIG. 6 or 7, a bitstream rewriter system as described with reference to FIG. 8, or other media processing tool.

To start, the media processing tool receives (1210), as part of a bitstream, encoded data for media content. The media content can be video content, audio content, image content, or some other type of media content. A value of a syntax element, which is signaled in association with the bitstream, indicates whether or not to perform SCEP processing on the encoded data. For example, the syntax element is a one-bit flag. Alternatively, the syntax element is some other data type (e.g., unsigned integer, which may jointly indicate other information). The syntax element can be signaled in a header of a NAL unit that includes at least part of the encoded data, in a header (defined according to a container format) of a container that includes at least part of the encoded data, in a header (defined according to a media elementary stream format) for a frame of the media content, or in some other way.

The media processing tool determines (1220), from the value of the syntax element, whether or not to perform SCEP processing on the encoded data. Then, the media processing tool selectively performs (1230) SCEP processing on the encoded data. For example, if SCEP processing is to be performed on the encoded data, the media processing tool scans the encoded data and, upon detection of a pattern that includes a SCEP byte, removes the SCEP byte. Or, if SCEP processing is not to be performed on the encoded data, the media processing tool skips the scanning and removal operations.

The media processing tool checks (1240) whether to continue for another unit of encoded data. If so, the media processing tool receives (1210) encoded data for the next unit and determines (1220) whether or not to perform SCEP processing on the encoded data for the next unit. In this way, the media processing tool can repeat the technique (1200) on a unit-by-unit basis. The units of encoded data can be NAL units for the H.264 standard or H.265 standard. Or, the units of encoded data can be some other type of units for a media codec standard or format, e.g., one that abstracts network layer processing away from the media elementary stream.

Alternatively, the media processing tool can skip operations to determine (1220) whether or not to perform SCEP processing for some units. For example, the media processing tool determines (1220) whether or not to perform SCEP processing when decoding or bitstream rewriting begins, but does not make the decision for each unit after that. Also, depending on how a SCEP on/off indicator is signaled, the media processing tool can skip operations to receive (1210) the value of a syntax element for the SCEP on/off indicator. For example, a SCEP on/off indicator can be signaled only for some types of units (e.g., for a parameter set for a picture, for a parameter set for a sequence) then remain in effect until replaced with another SCEP on/off indicator.

A media decoder can selectively perform (1230) SCEP processing on the encoded data. The media decoder can also decode the encoded data to reconstruct the media content and output the reconstructed media content. The media decoder or another component (e.g., a container DEMUX) can receive (1210) the encoded data as part of a bitstream and determine (1220), from the value of the syntax element, whether or not to perform SCEP processing on the encoded data. For example, if a SCEP on/off indicator is signaled as part of a media elementary, stream format, the media decoder can determine (1220), from the value of the syntax element, whether or not to perform SCEP processing on the encoded data. If a SCEP on/off indicator is signaled as part of a container, however, a container DEMUX can determine (1220), from the value of the syntax element, whether or not to perform SCEP processing on the encoded data.

Alternatively, a bitstream rewriter can receive (1210) the encoded data, determine (1220) whether or not to perform SCEP processing on the encoded data, and selectively perform (1230) SCEP processing on the encoded data. The bitstream rewriter can also output the encoded data.

I. Example Syntax for Signaling SCEP On/Off Decisions.

In various examples described herein, a syntax element signaled in association with a bitstream of encoded data indicates whether or not to perform SCEP processing on the encoded data. For example, the syntax element provides a SCEP on/off indicator for a unit of the encoded data. The syntax element can be signaled as part of a unit header, as part of a header for a container that includes the encoded data for the unit, or in some other way.

In general, the header is a syntax structure that includes one or more syntax elements. For example, a header includes zero or more syntax elements, followed by a syntax element that indicates whether or not to perform SCEP processing on encoded data, followed by zero or more other syntax elements. The syntax element that indicates whether or not to perform SCEP processing on encoded data can be a one-bit flag (e.g., Boolean value) or other data type. It can indicate only the decision whether or not to perform SCEP processing on encoded data, or it can jointly indicate other information.

FIG. 13 shows an example NAL unit (1300) based on the syntax of a NAL unit for the H.264 standard. In the example NAL unit (1300), the first two bytes of the NAL unit (1300) provide a header for the NAL unit (1300). The header includes syntax elements that provide information about the NAL unit (1300). In the header, the syntax element nal_unit_type is a 5-bit unsigned integer that indicates the type of the NAL unit (1300). The syntax element emulation_prevention_in_use is a 1-bit flag that indicates whether or not SCEP processing is to be performed for the NAL unit (1300). For example, in a proactive approach, the syntax element emulation_prevention_in_use indicates whether the NAL unit (1300) might contain SCEP bytes to disrupt emulated start codes, depending on start code usage. In a reactive approach, the syntax element emulation_prevention_in_use indicates whether the NAL unit (1300) actually includes one or more SCEP bytes to be removed. Other syntax elements of the header are not shown. A variable NumBytesInRBSP, which tracks the number of bytes of encoded data without SCEP bytes in the NAL unit, is initialized to be zero. Another variable NumBytesInNALunit, which is set based on length information in a container format or a count of bytes between start codes, indicates the number of bytes in the NAL unit, potentially including SCEP bytes.

If SCEP processing is to be performed on the encoded data of the NAL unit before decoding, the value of emulation_prevention_in_use is 1. In this case, the decoder (or other media processing tool) scans through the encoded data of the NAL unit (1300) on a byte-after-byte basis, starting from the byte after the header and continuing until the count of NumBytesInNALunit bytes is reached. At each byte position, as long as there are at least three bytes left, the decoder (or other media processing tool) checks whether the next three bytes are equal to 0x000003. If so, the decoder (or other media processing tool) keeps two bytes of encoded data (reading and retaining two bytes as rbsp_byte[NumBytesInRBSP++]), increases the byte position by 2, removes the SCEP byte (reading and discarding the 8 bits of the emulation_prevention_three_byte), and continues at the next byte position. On the other hand, if the next three bytes are not equal to 0x000003, the decoder (or other media processing tool) keeps a single byte of encoded data (reading and retaining one byte as rbsp_byte[NumBytesInRBSP++]) and continues at the next byte position.

Otherwise, if SCEP processing is not to be performed on the encoded data of the NAL unit before decoding, the value of emulation_prevention_in_use is 0. In this case, the decoder (or other media processing tool) keeps all bytes of encoded data (reading and retaining each byte as rbsp_byte[NumBytesInRBSP++]). Compared to operations when SCEP processing is performed, the decoder (or other media processing tool) skips scanning operations to check whether there are at least three bytes left and compare three-byte sequences to 0x000003.

FIG. 14*a* shows an example NAL unit (1400) based on the syntax of a NAL unit for the H.265 standard. In the example NAL unit (1400), the first three bytes of the NAL unit (1400) provide a header (1410) (called nal_unit_header( )) for the NAL unit (1400). The header (1410) includes syntax elements that provide information about the NAL unit (1400). Specifically, the syntax element nal_unit_type is a 6-bit unsigned integer value that indicates the type of the NAL unit (1400), and the syntax element emulation_prevention_in_use is a 1-bit flag that indicates whether or not SCEP processing is to be performed for the NAL unit (1400). The values of the syntax element emulation_prevention_in_use, and the operations of a decoder (or other media processing tool) that processes the NAL unit (1400), are the same as those described with reference to the example NAL unit (1300) of FIG. 13.

FIGS. 15*a* and 15*b* show example NAL units (1501, 1502) according to another approach. The example NAL units (1501, 1502) are based on the example NAL unit (1400) of FIG. 14, but the decision about whether or not to perform SCEP processing is made outside the NAL unit processing. In this approach, a decoder (or other media processing tool) can perform SCEP processing on encoded data for a given NAL unit (as shown in FIG. 15*a*) or skip SCEP processing on the encoded data for the given NAL unit (as shown in FIG. 15*b*). The decoder (or other media processing tool) can switch between the two different types of NAL units (that is, NAL unit (1501) with SCEP processing or NAL unit (1502) without SCEP processing) based on a SCEP on/off indicator provided to it (e.g., by a container DEMUR, when the SCEP on/off indicator is signaled in a container header). In this approach, the NAL unit header for the NAL unit lacks a syntax element for a SCEP on/off indicator.

Alternatively, a syntax element that indicates whether or not to perform SCEP processing on encoded data can be signaled in some other way. For example, the syntax element can be a field of a sequence header, picture header, slice header, or other header for some portion of media content. The syntax element can be defined according to a media elementary stream format, or the syntax element can be signaled as custom data or user data.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a computer system programmed thereby to perform operations, the operations comprising:

selectively performing start code emulation prevention (SCEP) processing on encoded data for media content, wherein the selectively performing SCEP processing depends on start code usage for the encoded data, and wherein the selectively performing SCEP processing includes:
   if SCEP processing is performed on the encoded data, scanning the encoded data and, upon detection of a pattern that emulates a start code, inserting a SCEP byte to disrupt the pattern; and
   otherwise, skipping the scanning and inserting;
setting a value of a syntax element that indicates whether or not to perform SCEP processing on the encoded data; and
storing the encoded data for output as part of a bitstream, wherein the syntax element is signaled in association with the bitstream.

2. The one or more computer-readable media of claim 1, wherein the syntax element is a one-bit flag, and wherein the syntax element is signaled in one of:
   a header of a network abstraction layer unit that includes at least part of the encoded data;
   a header, defined according to a container format, of a container that includes at least part of the encoded data; and
   a header, defined according to a media elementary stream format, for a frame of the media content.

3. The one or more computer-readable media of claim 1, wherein the operations further comprise:
   receiving the media content; and
   with a media encoder, encoding the media content to produce the encoded data, wherein the media encoder also selectively performs the SCEP processing on the encoded data.

4. The one or more computer-readable media of claim 1, wherein the operations further comprise:
   receiving the encoded data, wherein a bitstream rewriter selectively performs SCEP processing on the encoded data and sets the value of the syntax element.

5. The one or more computer-readable media of claim 1, wherein the media content is selected from the group consisting of video content, audio content, and image content.

6. The one or more computer-readable media of claim 1, wherein the value of the syntax element that indicates whether or not to perform SCEP processing on the encoded data is set based on one or more of:
   a setting that indicates whether start codes are used, wherein SCEP processing is performed on the encoded data if start codes are used; and
   a container format for the encoded data, wherein SCEP processing is performed on the encoded data if the container format lacks, for units of the encoded data, respectively, fields indicating lengths of the encoded data for the respective units.

7. A computing device comprising:
memory configured to receive, as part of a bitstream, encoded data for media content, wherein a value of a syntax element, signaled in association with the bitstream, indicates whether or not to perform start code emulation prevention (SCEP) processing on the encoded data; and
one or more processing units configured to perform operations comprising:
   determining, from the value of the syntax element, whether or not to perform SCEP processing on the encoded data; and
   selectively performing SCEP processing on the encoded data, wherein the selectively performing SCEP processing on the encoded data includes:
      if SCEP processing is to be performed on the encoded data, scanning the encoded data and, upon detection of a pattern that includes a SCEP byte, removing the SCEP byte; and
      otherwise, skipping the scanning and removing.

8. The computing device of claim 7, wherein the syntax element is signaled in one of:
   a header of a network abstraction layer unit that includes at least part of the encoded data;
   a header, defined according to a container format, of a container that includes at least part of the encoded data; and
   a header, defined according to a media elementary stream format, for a frame of the media content.

9. The computing device of claim 7, wherein a media decoder selectively performs SCEP processing on the encoded data, the operations further comprising, with the media decoder:
   decoding the encoded data to reconstruct the media content; and
   outputting the reconstructed media content.

10. The computing device of claim 7, wherein a bitstream rewriter determines whether or not to perform SCEP processing, and selectively performs SCEP processing on the encoded data, the operations further comprising, with the bitstream rewriter, outputting the encoded data.

11. The computing device of claim 7, wherein the syntax element is a one-bit flag.

12. One or more computer-readable media having stored thereon as part of a bitstream, encoded data for media content, wherein a value of a syntax element, signaled in association with the bitstream, indicates whether or not to perform start code emulation prevention (SCEP) processing on the encoded data, the bitstream being organized for processing with operations comprising:
   determining, from the value of the syntax element, whether or not to perform SCEP processing on the encoded data; and
   selectively performing SCEP processing on the encoded data, wherein the selectively performing SCEP processing on the encoded data includes:
      if SCEP processing is to be performed on the encoded data, scanning the encoded data and, upon detection of a pattern that includes a SCEP byte, removing the SCEP byte; and
      otherwise, skipping the scanning and removing.

13. The one or more computer-readable media of claim 12, wherein the syntax element is a one-bit flag, and wherein the syntax element is signaled in one of:
   a header of a network abstraction layer unit that includes at least part of the encoded data;
   a header, defined according to a container format, of a container that includes at least part of the encoded data; and
   a header, defined according to a media elementary stream format, for a frame of the media content.

14. The one or more computer-readable media of claim 12, the operations further comprising, with a media decoder:
   decoding the encoded data to reconstruct the media content; and
   outputting the reconstructed media content.

15. The one or more computer-readable media of claim 12, the operations further comprising, with a bitstream rewriter determining whether or not to perform SCEP processing, and outputting the encoded data.

16. A computing device comprising:
one or more processing units configured to perform operations comprising:
selectively performing start code emulation prevention (SCEP) processing on encoded data for media content, wherein the selectively performing SCEP processing depends on presence of emulated start codes in respective units of the encoded data, and wherein the selectively performing SCEP processing includes:
scanning the encoded data; and
upon detection of a pattern that emulates a start code, inserting a SCEP byte to disrupt the pattern; and
setting a value of a syntax element that indicates whether or not to perform SCEP processing on the encoded data; and
memory configured to store the encoded data for output as part of a bitstream, wherein the syntax element is signaled in association with the bitstream.

17. The computing device of claim 16, wherein the syntax element is a one-bit flag, and wherein the syntax element is signaled in one of:
a header of a network abstraction layer unit that includes at least part of the encoded data;
a header, defined according to a container format, of a container that includes at least part of the encoded data; and
a header, defined according to a media elementary stream format, for a frame of the media content.

18. The computing device of claim 16, wherein the operations further comprise:
receiving the media content; and
with a media encoder, encoding the media content to produce the encoded data, wherein the media encoder also selectively performs the SCEP processing on the encoded data.

19. The computing device of claim 16, wherein the operations further comprise:
receiving the encoded data, wherein a bitstream rewriter selectively performs the SCEP processing on the encoded data and sets the value of the syntax element.

20. The computing device of claim 16, wherein the operations further comprise checking, on a unit-by-unit basis for the respective units of the encoded data, whether a given unit includes any pattern that emulates a start code, and wherein the value of the syntax element, for one of the respective units of the encoded data, is set based on results of the checking for that unit of the encoded data.

* * * * *